US011217253B2

(12) United States Patent
Fujita et al.

(10) Patent No.: US 11,217,253 B2
(45) Date of Patent: Jan. 4, 2022

(54) INFORMATION PROCESSING APPARATUS, INFORMATION PROCESSING METHOD, AND INFORMATION PROCESSING SYSTEM

(71) Applicant: Sony Mobile Communications Inc., Tokyo (JP)

(72) Inventors: Satoshi Fujita, Tokyo (JP); Hiroaki Adachi, Tokyo (JP); Yoji Hirose, Tokyo (JP); Fumiaki Tokuhisa, Tokyo (JP); Ryu Aoyama, Tokyo (JP); Izumi Yagi, Tokyo (JP); Akihiro Ishida, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 168 days.

(21) Appl. No.: 16/469,149

(22) PCT Filed: Jan. 24, 2018

(86) PCT No.: PCT/JP2018/002130
§ 371 (c)(1),
(2) Date: Jun. 13, 2019

(87) PCT Pub. No.: WO2018/155052
PCT Pub. Date: Aug. 30, 2018

(65) Prior Publication Data
US 2020/0098373 A1     Mar. 26, 2020

(30) Foreign Application Priority Data
Feb. 24, 2017   (JP) .............................. JP2017-033964

(51) Int. Cl.
*G10L 15/30*     (2013.01)
*G06F 3/01*     (2006.01)
*G10L 15/22*     (2006.01)

(52) U.S. Cl.
CPC .............. *G10L 15/30* (2013.01); *G06F 3/017* (2013.01); *G10L 15/22* (2013.01)

(58) Field of Classification Search
CPC ................................. G10L 15/30; G06F 3/017
See application file for complete search history.

(56) References Cited

U.S. PATENT DOCUMENTS

2001/0011014 A1    8/2001   Higuchi et al.
2001/0027111 A1    10/2001   Motegi et al.
(Continued)

FOREIGN PATENT DOCUMENTS

CN     102035933 A     4/2011
CN     103929523 A     7/2014
(Continued)

OTHER PUBLICATIONS

Extended European Search Report dated Nov. 19, 2019, issued in corresponding European Patent Application No. 18757017.1.
(Continued)

*Primary Examiner* — Ibrahim Siddo
(74) *Attorney, Agent, or Firm* — Xsensus LLP

(57) ABSTRACT

An information processing apparatus includes a talk control unit that controls proxy utterance processing in voice talk processing on the basis of environment information regarding a user terminal acquired from the user terminal. Furthermore, there is provided an information processing method performed by a processor, including: acquiring environment information regarding a user terminal from the user terminal; and controlling proxy utterance processing in voice talk processing on the basis of the acquired environment information. Furthermore, there is provided an information processing system including: a user terminal that is able to acquire environment information regarding the user terminal; and a server that includes a talk control unit
(Continued)

controlling proxy utterance processing in voice talk processing on the basis of the environment information regarding the user terminal acquired from the user terminal.

17 Claims, 19 Drawing Sheets

(56) References Cited

U.S. PATENT DOCUMENTS

| | | |
|---|---|---|
| 2004/0086102 A1 | 5/2004 | McMurry |
| 2005/0233766 A1 | 10/2005 | Futami |
| 2007/0121902 A1 | 5/2007 | Stoica |
| 2007/0135089 A1 | 6/2007 | Edge |
| 2013/0315107 A1* | 11/2013 | Lindner ............... G06F 1/1694 370/277 |
| 2015/0229764 A1 | 8/2015 | Shiga |
| 2016/0149839 A1 | 5/2016 | Yi |
| 2017/0093994 A1* | 3/2017 | Tateno ............... G06Q 50/01 |

FOREIGN PATENT DOCUMENTS

| | | |
|---|---|---|
| CN | 103973724 A | 8/2014 |
| CN | 103973859 A | 8/2014 |
| CN | 105100482 A | 11/2015 |
| CN | 104935727 A | 8/2018 |
| JP | 2003-274459 A | 9/2003 |
| JP | 2004112820 A | 4/2004 |
| JP | 2005-303832 A | 10/2005 |
| JP | 2009094893 A | 4/2009 |
| JP | 2010-34695 A | 2/2010 |
| JP | 2013-156103 A | 8/2013 |
| KR | 20070071880 A | 7/2007 |

OTHER PUBLICATIONS

International Search Report and Written Opinion dated Apr. 17, 2018 for PCT/JP2018/002130 filed on Jan. 24, 2018, 7 pages including English Translation of the International Search Report.

* cited by examiner

INFORMATION PROCESSING APPARATUS, INFORMATION PROCESSING METHOD, AND INFORMATION PROCESSING SYSTEM

CROSS-REFERENCE TO RELATED APPLICATIONS

The present application is based on PCT filing PCT/JP2018/002130, filed Jan. 24, 2018 which claims priority to JP 2017-033964, filed Feb. 24, 2017, the entire contents of each are incorporated herein by reference.

TECHNICAL FIELD

The present disclosure relates to an information processing apparatus, an information processing method, and an information processing system.

BACKGROUND ART

In recent years, technologies related to a talk in a group including a plurality of users as well as a talk between users have been developed. In starting the talk in the group, the user is required to select a user or a group that is a talk target.

For example, Patent Document 1 discloses a technology that allows a user to select a talk target by continuously pressing a push-to-talk (PTT) key of a mobile phone and speaking a name of a user or a group of the talk target.

CITATION LIST

Patent Document

Patent Document 1: Japanese Patent Application Laid-Open No. 2012-16040

SUMMARY OF THE INVENTION

Problems to be Solved by the Invention

However, in the technology disclosed in Patent Document 1, it is required for the user to manipulate the mobile phone to select another user who is to join a group and create and edit the group. Therefore, in such grouping of user terminals such as mobile phones, a burden imposed on the user due to a procedure is large.

The present disclosure proposes a novel and improved information processing apparatus, an information processing method, and an information processing system capable of controlling proxy utterance processing on the basis of environment information regarding a user terminal.

Solutions to Problems

According to the present disclosure, there is provided an information processing apparatus including: a talk control unit that controls proxy utterance processing in voice talk processing on the basis of environment information regarding a user terminal acquired from the user terminal.

Furthermore, according to the present disclosure, there is provided an information processing method performed by a processor, including: acquiring environment information regarding a user terminal from the user terminal; and controlling proxy utterance processing in voice talk processing on the basis of the acquired environment information.

Furthermore, according to the present disclosure, there is provided an information processing system including: a user terminal that is able to acquire environment information regarding the user terminal; and a server that includes a talk control unit controlling proxy utterance processing in voice talk processing on the basis of the environment information regarding the user terminal acquired from the user terminal.

Effects of the Invention

As described above, according to the present disclosure, it is possible to control proxy utterance processing on the basis of environment information regarding a user terminal.

Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
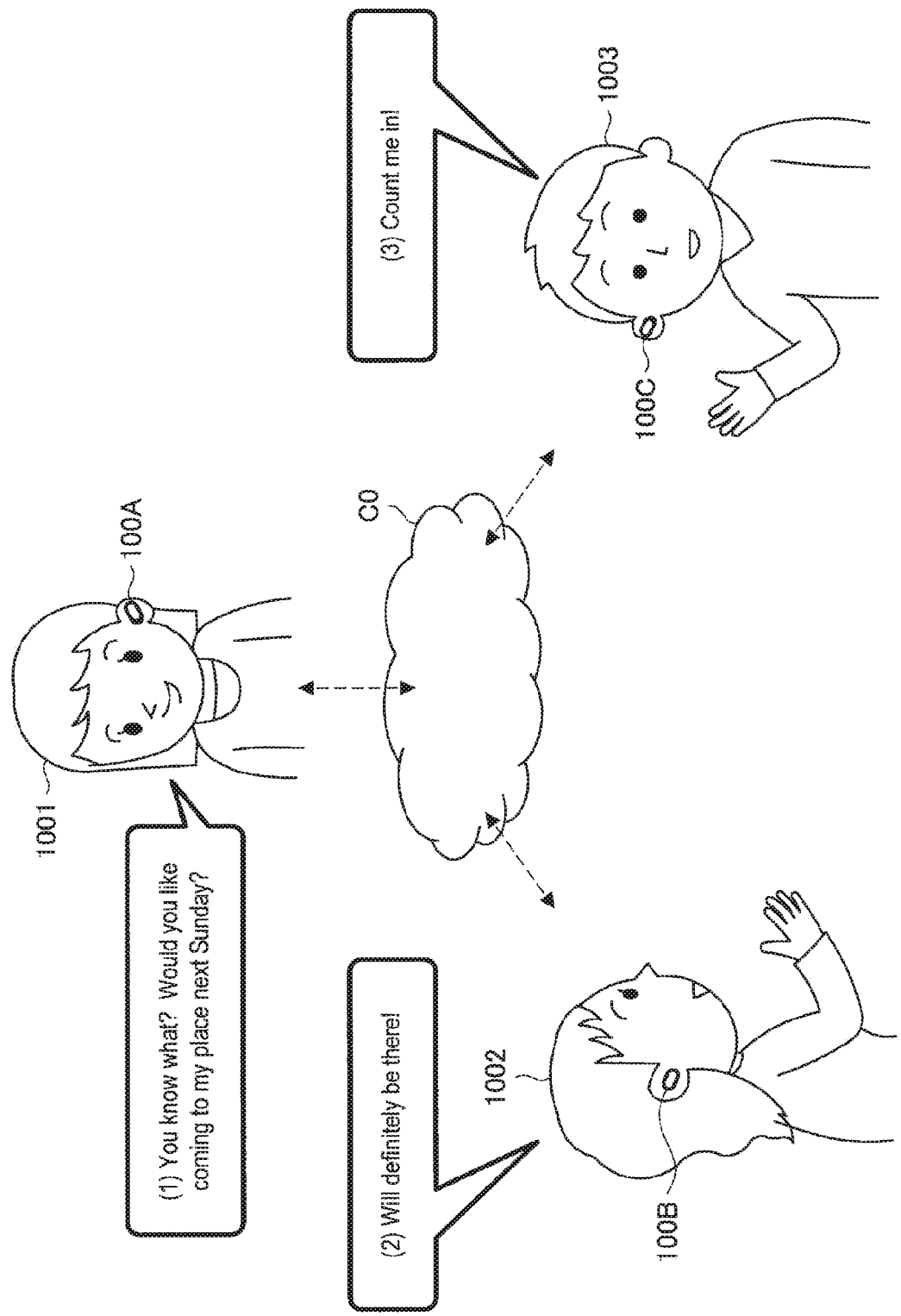
FIG. 1 is a view for describing an overview of an information processing system according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.
1. Overview
2. First Embodiment
　2.1. Configuration Example
　2.2. Processing Example of Server
　2.3. Grouping Processing Example
3. Second Embodiment
　3.1. Start Processing of Voice Communication
　3.2. Selection Processing of Talk Target
　3.3. Voice Output Processing in Voice Communication with Talk Target
4. Third Embodiment
5. Fourth Embodiment
6. Fifth Embodiment
7. Hardware Configuration
8. Summary
《1. Overview》

FIG. 1 is a view for describing an overview of an information processing system according to an embodiment of the present disclosure. As illustrated in FIG. 1, the information processing system according to the present embodiment is a system for a plurality of users to talk to one another by a voice through a cloud server C0. Specifically, as illustrated in FIG. 1, users 1001, 1002, and 1003 can talk to one another by a voice through the cloud server C0 using small terminals 100A, 100B, and 100C (hereinafter, collectively referred to as a small terminal 100 unless they are particularly distinguished from each other) worn on their ears. Furthermore, in the information processing system according to the present embodiment, various kinds of processing can be performed on a talk target such as a user or a group including a plurality of users by performing various manipulations on the small terminal 100 worn on the ear.

Figure 2:
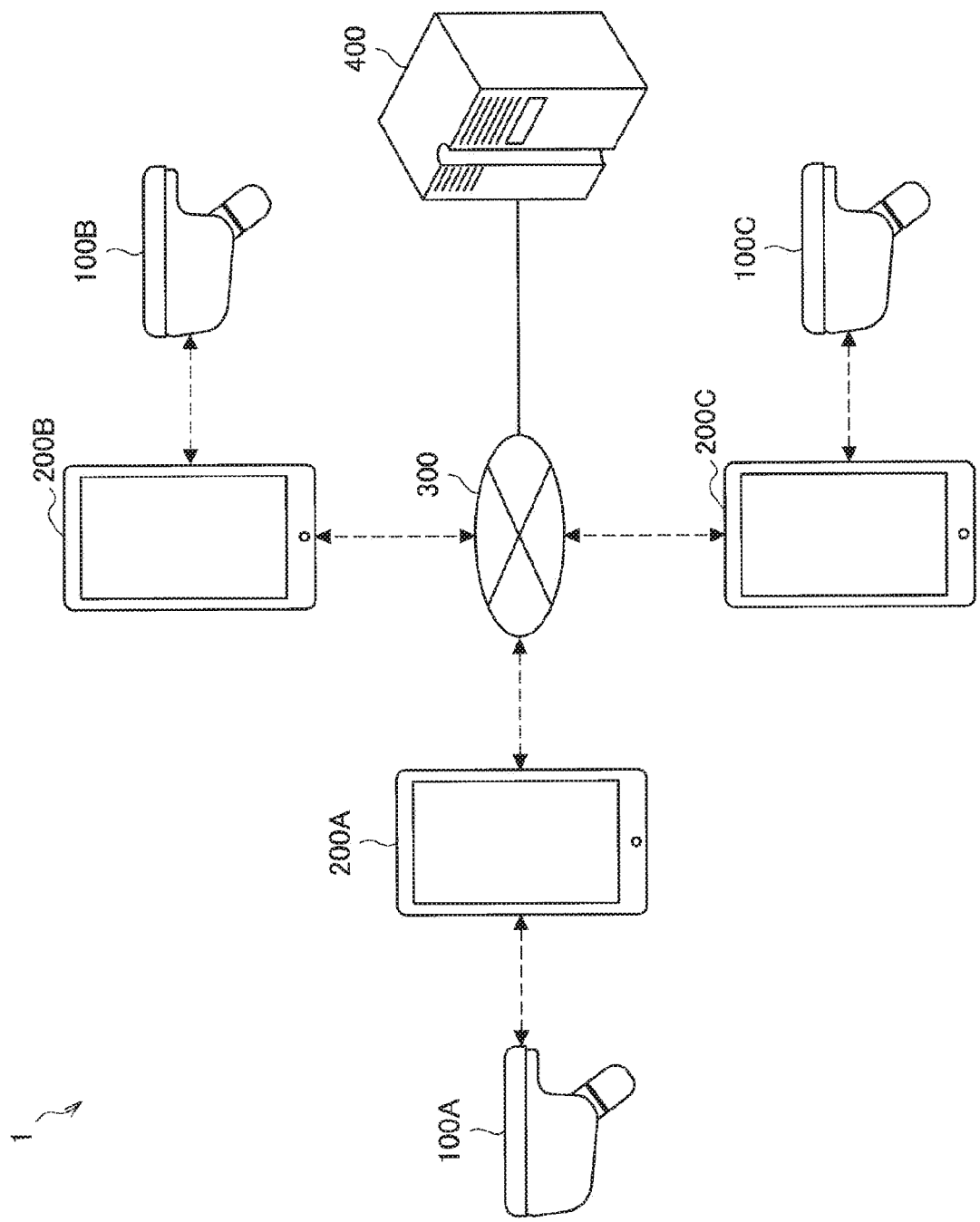
FIG. 2 is a view illustrating a schematic configuration of the information processing system according to the embodiment of the present disclosure.

FIG. 2 is a view illustrating a schematic configuration of an information processing system 1 according to an embodiment of the present disclosure. As illustrated in FIG. 2, the information processing system 1 according to the present embodiment includes the small terminal 100 (100A, 100B, and 100C), a mobile terminal 200 (200A, 200B, and 200C), a communication network 300, and a server 400.

The small terminal 100 is an example of a voice input/output device. Specifically, the small terminal 10 is a device that can be worn on a user's ear, such as an earphone. The small terminal 100 includes, for example, a speaker and a microphone so as to realize a talk by a user. Furthermore, the small terminal 100 includes various sensors, an input unit such as a button, and the like, and can be manipulated by the user. Furthermore, the small terminal 100 is connected by near field communication. Note that the small terminal 100 and the mobile terminal 200 may be connected to each other by wired communication. With such a connection, the user can manipulate functions and applications of the mobile terminal 200 by manipulating the small terminal 100.

Note that in another embodiment, the small terminal 100 may not be a terminal that can be worn on the user's ear. For example, an aspect of the small terminal is not limited as long as the small terminal 100 includes a speaker and a microphone so as to realize the talk by the user.

The mobile terminal 200 is realized by, for example, an information processing terminal such as a mobile phone, a smartphone, a tablet, a notebook personal computer (PC), or a game machine The mobile terminal 200 is connected to, for example, the small terminal 100 and the communication network 300. Furthermore, the mobile terminal 200 also includes, for example, a display unit displaying various types of information and a manipulation unit receiving an input for the mobile terminal 200. The display unit and the manipulation unit may be formed integrally with each other, for example, like a touch panel.

Furthermore, the mobile terminal 200 has various functions and applications, which can be executed by user's manipulation (including a manipulation through the small terminal 100). Note that such functions and applications may be realized by the server 400. The functions and the applications of the mobile terminal 200 include, for example, an email, a short message, a social networking service, photography, music playback, a browsing function, map display, scheduling, a context analysis function, and the like.

The server 400 is connected to the mobile terminal 200 through the communication network 300. The server 400 performs processing corresponding to the functions or applications of the mobile terminal 200. For example, the server 400 acquires audio data from the mobile terminal 200A, and transmits the processed audio data to the other mobile terminals 200B and 200C.

Note that the small terminal 100, the mobile terminal 200, and the server 400 are examples of an information processing apparatus. Furthermore, the small terminal 100 and the mobile terminal 200 are examples of a user terminal or a device. In other words, the information processing apparatus, the user terminal, and the device may be separate devices or may be a single device. For example, in each of the following embodiments, a case where the server 400 is an information processing apparatus, the small terminal 100 is a user terminal, and the mobile terminal 200 is a device different from the user terminal will be described.

Furthermore, an information processing system 1 according to another embodiment may include a mobile terminal 200 and a server 400. In other words, the information processing system 1 may not necessarily include a small terminal 100 as long as a function realized by the information processing system 1 according to the following embodiment is exerted without using the small terminal 100. In this case, the mobile terminal 200 is a user terminal.

Furthermore, an information processing system 1 according to another embodiment may include a small terminal 100 and a server 400. In other words, the information processing system 1 may not necessarily include a mobile terminal 200 as long as a function realized by the information processing system 1 according to the following embodiment is exerted without using the mobile terminal 200. In this case, the small terminal 100 is a user terminal. For example, the small terminal 100 may be directly connected to the communication network 300.

Furthermore, the server 400 may be realized by a plurality of information processing apparatuses, like a cloud server. Furthermore, instead of the server 400, one or a plurality of mobile terminals 200 may be realized as an information processing apparatus. In this case, the communication network 300 may configure a peer to peer (P2P)-type network instead of configuring a client server-type network as illustrated in FIG. 2. In other words, the information processing system 1 may include the small terminal 100 and the mobile terminal 200. Furthermore, instead of the server 400, the small terminal 100 may be realized as the information processing apparatus. In this case, the information processing system 1 may include the small terminal 100.

2. First Embodiment

<2.1. Configuration Example>

Figure 3:
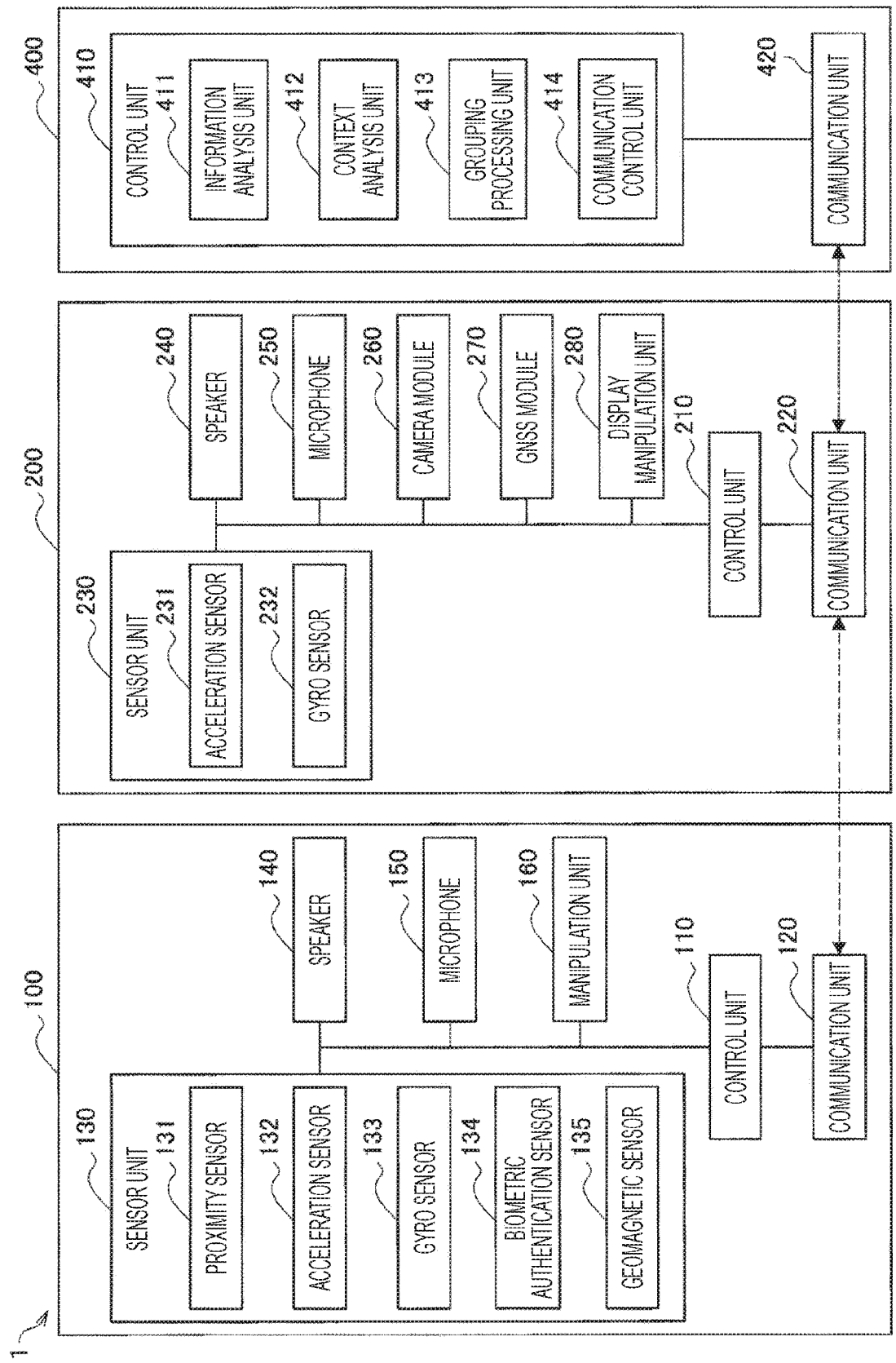
FIG. 3 is a block diagram illustrating a configuration of an information processing system according to a first embodiment of the present disclosure.

Next, a detailed configuration of an information processing system 1 according to a first embodiment of the present disclosure will be described. FIG. 3 is a block diagram illustrating a configuration of the information processing system 1 according to the first embodiment of the present disclosure. Since the configuration between the respective apparatuses is as described above, configurations of the respective apparatuses will hereinafter be described.

First, the small terminal 100 includes a control unit 110, a communication unit 120, a sensor unit 130, a speaker 140, a microphone 150, and a manipulation unit 160.

The control unit 110 functions as an arithmetic processing device and a control device, and generally controls an operation of the small terminal 100. The control unit 110 is realized by, for example, an electronic circuit such as a central processing unit (CPU) or a microprocessor. Furthermore, the control unit 110 may include a read only memory (ROM) storing programs that are used, calculation parameters, or the like and a random access memory (RAM) temporarily storing parameters or the like that are appropriately changed.

The control unit 110 processes information acquired from at least any one of, for example, the communication unit 120, the sensor unit 130, the microphone 150, or the manipulation unit 160, and outputs the processed information to at least any one of the communication unit 120 or the speaker 140.

The communication unit 120 can be realized by a near field communication interface such as Bluetooth (registered trademark) or ZigBee (registered trademark). The communication unit 120 performs communication with another apparatus such as the mobile terminal 200. In the small terminal 100, a small-capacity battery (not illustrated) is used. Therefore, for example, a power saving near field communication interface such as Bluetooth Low Energy may be used.

Note that the small terminal 100 and the mobile terminal 200 can be connected to each other by pairing. The pairing is performed by searching for devices present in a range which radio waves reach and allowing a user to select a device to which he/she wants to connect among the detected devices. Regarding the pairing, the small terminal 100 and the mobile terminal 200 may be configured to perform authentication on each other by using, for example, an authentication code or the like.

The sensor unit 130 includes one or a plurality of sensor devices and generates sensor information. The sensor unit 130 according to the present embodiment includes a proximity sensor 131, an acceleration sensor 132, a gyro sensor 133, and a biometric authentication sensor 134.

The proximity sensor 131 is realized by an infrared sensor, a contact sensor, an ultrasonic sensor, an electromagnetic wave sensor, or the like, and has a function of detecting proximity or contact of a target to be detected. Specifically, the control unit 110 determines whether or not the small terminal 100 is worn on the user's ear on the basis of a detected signal by the proximity sensor 131 according to the present embodiment.

The acceleration sensor 132 has a function of detecting an acceleration applied to the small terminal 100. The acceleration sensor 132 can be realized by, for example, a known acceleration sensor such as a semiconductor type or an optical type.

The gyro sensor 133 has a function of detecting a posture, an angular velocity, an angular acceleration, or the like, of the small terminal 100. The gyro sensor 133 can be realized by, for example, a known gyroscope or gyro sensor such as a capacitance type, a piezoelectric type, or a piezo type.

Note that sensor information obtained from the proximity sensor 131, the acceleration sensor 132, and the gyro sensor 133 means information regarding a motion of the small terminal 100.

The biometric authentication sensor 134 has a function of detecting information (biometric information) regarding a feature of a part of a living body touching a predetermined place of the small terminal 100. The biometric authentication sensor 134 can be realized by, for example, a known fingerprint sensor, a vein sensor or the like.

A geomagnetic sensor 135 has a function of detecting an azimuth of the small terminal 100.

The speaker 140 has a function of outputting a voice on the basis of voice information processed by the control unit 110. For example, the speaker 140 may output a voice on the basis of voice information acquired from the mobile terminal 200 through the communication unit 120. Note that in the present specification, the voice information is not limited to a voice uttered by the user, but means information generated on the basis of all sounds (in other words, information regarding a sound). Furthermore, the voice information is an example of the sensor information.

The microphone 150 has a function of collecting sounds to generate voice information and outputting the voice information to the control unit 110. For example, the microphone 150 collects voices uttered by the user to generate voice information, and outputs the voice information to the control unit 110. In this case, the control unit 110 can transmit the voice information to the mobile terminal 200.

The manipulation unit 160 has a function of detecting a signal generated by a manipulation of the user performed on the small terminal 100. The manipulation unit 160 can be realized by, for example, mechanical buttons or dials, a capacitive or resistive touch panel or the like. In a case where the buttons are provided as the manipulation unit 160, the number of installed buttons, arrangement positions of the buttons, and the like are not particularly limited.

Note that the small terminal 100 may further include a camera module, a global navigation satellite system (GNSS) module, another sensor, or the like mounted therein.

Next, the mobile terminal 200 includes a control unit 210, a communication unit 220, a sensor unit 230, a speaker 240, a microphone 250, a camera module 260, a GNSS module 270, and a display manipulation unit 280. Furthermore, the mobile terminal 200 can also include a storage unit (not illustrated).

The control unit 210 functions as an arithmetic processing device and a control device, and generally controls an operation of the mobile terminal 200. The control unit 210 is realized by, for example, an electronic circuit such as a CPU or a microprocessor. Furthermore, the control unit 210 may include a ROM storing programs that are used, calculation parameters, or the like and a RAM temporarily storing parameters or the like that are appropriately changed.

Furthermore, the control unit 210 processes information (for example, environment information) acquired from at least any one of the communication unit 220, the sensor unit 230, the microphone 250, the camera module 260, the GNSS module 270, or the display manipulation unit 280, and outputs the processed information to at least any one of the communication unit 220, the speaker 240, or the display manipulation unit 280. More specifically, the control unit 210 controls the communication unit 220 to transmit information (for example, environment information) acquired from the small terminal 100 or the like through the communication unit 220 to the server 400. Furthermore, the control unit 210 may appropriately store the acquired or processed information in a storage unit (not illustrated). Note that such a storage unit can be realized by, for example, a storage such as a hard disk drive (HDD), a solid state drive (SSD) or a flash memory.

The communication unit 220 has a function of performing communication with the small terminal 100 and the server 400. For example, the communication unit 220 may be realized by a near field communication interface such as Bluetooth (registered trademark) or ZigBee (registered trademark). In this case, the communication unit 220 performs communication with another apparatus such as the small terminal 100 by near field communication.

Furthermore, the communication unit 220 may be realized by, for example, a communication interface such as a wired/wireless local area network (LAN), Wi-Fi (registered trademark), or a mobile communication network (long term evolution (LTE)), or third-generation (3G) mobile communications). In this case, the communication unit 220 performs communication with another apparatus such as the server 400 in a wired or wireless manner.

The sensor unit 230 includes one or a plurality of sensor devices and generates sensor information. The sensor unit 230 according to the present embodiment includes an acceleration sensor 231 and a gyro sensor 232. Functions of the acceleration sensor 231 and the gyro sensor 232 are similar to those of the acceleration sensor 132 and the gyro sensor 133 described above, and a description thereof is thus omitted. Note that sensor information obtained from the acceleration sensor 231 and the gyro sensor 232 means information regarding a motion of the mobile terminal 200.

The speaker 240 has a function of outputting a voice on the basis of voice information processed by the control unit 210. For example, the speaker 240 may output a voice on the basis of voice information acquired from the small terminal 100 or the server 400 through the communication unit 220.

The microphone 250 has a function of collecting sounds to generate voice information and outputting the voice information to the control unit 110. For example, the microphone 250 outputs the voice information generated by collecting voices uttered by the user to the control unit 210. In this case, the control unit 210 can transmit the voice information to the small terminal 100 or the server 400. Such voice information is an example of the sensor information.

The camera module 260 is realized by an image capturing device or the like such as a charge coupled device (CCD) or a complementary metal oxide semiconductor (CMOS). The camera module 260 has a function of capturing an image of a real space to generate image information such as a still image, a moving image, or a time-lapse image.

The GNSS module 270 has a function of generating position information of the mobile terminal 200. For example, the GNSS module 270 positions the mobile terminal 200 using a system such as a global positioning system (GPS), and generates position information of the mobile terminal 200 on the basis of a positioning result. Such position information is an example of the sensor information.

The display manipulation unit 280 has a display function of displaying information and a manipulation function of receiving a manipulation from the user. The display manipulation unit 280 can be realized by, for example, a touch panel or the like. Furthermore, the display manipulation unit 280 may be a unit in which the display function and the manipulation function are realized separately from each other like a display and a button.

Next, the server 400 includes a control unit 410 and a communication unit 420. Furthermore, the server 400 can also include a storage unit (not illustrated).

The control unit 410 functions as an arithmetic processing device and a control device, and generally controls an operation of the server 400. The control unit 410 is realized by, for example, an electronic circuit such as a CPU or a microprocessor. Furthermore, the control unit 410 may include a ROM storing programs that are used, calculation parameters, or the like and a RAM temporarily storing parameters or the like that are appropriately changed.

Furthermore, the control unit 410 processes information acquired from the communication unit 420, and outputs the processed information to the communication unit 420. The control unit 410 may appropriately store the acquired or processed information in a storage unit (not illustrated). Note that such a storage unit can be realized by, for example, a storage such as an HDD, an SSD, or a flash memory. A specific functional configuration of the control unit 410 will be described later.

The communication unit 420 is realized by, for example, a communication interface such as a wired/wireless LAN, Wi-Fi (registered trademark), or a mobile communication network (long term evolution (LTE) or third-generation (3G) mobile communications). The communication unit 420 performs communication with another apparatus such as the mobile terminal 200 in a wired or wireless manner.

In a case where the small terminal 100 includes the communication interface capable of performing the communication in the wired or wireless manner as described above, the communication unit 420 can also perform communication with the small terminal 100.

The control unit 410 according to the present embodiment includes an information analysis unit 411, a context analysis unit 412, a grouping processing unit 413, and a communication control unit 414.

(Information Analysis Unit)

The information analysis unit 411 has a function of analyzing the sensor information or the image information acquired from the mobile terminal 200. For example, the information analysis unit 411 may analyze the voice information which is an example of the sensor information, the information regarding the motion of the user terminal, or the position information, and output analysis results.

An example of the analysis result of the voice information can include a similarity of a content of the voice contained in the voice information. A known voice analysis technology can be used to analyze such voice information. An example of the analysis result of the information regarding the motion of the user terminal can include a similarity of the motion of the small terminal 100 or the mobile terminal 200 within a predetermined time.

Furthermore, the information analysis unit 411 may analyze the image information and output an analysis result. A known image analysis technology can be used to analyze the image information.

Note that such sensor information may be the sensor information (including the voice information) acquired by the small terminal 100 or may be the sensor information (including the voice information and the position information) acquired by the mobile terminal 200. In this case, the mobile terminal 200 corresponds to the user terminal, and the sensor information obtained from the mobile terminal 200 corresponds to first sensor information. Furthermore, the small terminal 100 corresponds to a device different from the user terminal, and the sensor information obtained from the small terminal 100 corresponds to second sensor information.

Furthermore, the information analysis unit 411 may analyze sensor information acquired from devices other than the small terminal 100 and the mobile terminal 200. Such sensor information may be, for example, sensor information generated by an environmental sensor installed in a predetermined space. Such an environmental sensor may be, for example, a temperature sensor, a humidity sensor, an illuminance sensor, a sound sensor, a distance measuring sensor, an infrared sensor, an ultrasonic sensor, or the like. In this case, any one of the small terminal 100 or the mobile terminal 200 corresponds to the user terminal, and the environmental sensor corresponds to a device different from the user terminal.

The analysis result obtained by the analysis of the information analysis unit 411 is output to the grouping processing unit 413. Note that the analysis processing by the information analysis unit 411 may not necessarily be performed on information on which analysis by the information analysis unit 411 is not required, such as the position information. In this case, the position information or the like acquired by the communication unit 420 can be directly input to the grouping processing unit 413.

(Context Analysis Unit)

The context analysis unit 412 has a function of analyzing a context of the user who uses the user terminal from the environment information obtained from the user terminal to acquire information regarding the context. Here, the context means a situation (in other words, context awareness) of the user who uses the user terminal. Specifically, the context analysis unit 412 analyzes a context of the user who possesses the mobile terminal 200 from the environment information (including the information analyzed and processed by the information analysis unit 411) obtained from the mobile terminal 200. Then, the context analysis unit 412 outputs an analysis result of the context as information regarding the context. Note that a known technology can be used to perform the analysis processing on the context by the context analysis unit 412.

The context analysis unit 412 analyzes the context from at least one of, for example, time information, the position information, the sensor information, or the like. Specifically, the context analysis unit 412 can analyze that the user is running from the fact that the position information is changed in time series, the motion of the user is large from the sensor information, and a running-related application installed in the mobile terminal 200 is starting up.

Furthermore, the context analysis unit 412 may analyze the context on the basis of a history of the past environment information. Specifically, the context analysis unit 412 may analyze behavior of the user from a history of the past position information and analyze the context of the user from an analysis result.

Besides, for example, as illustrated in the following Table 1, the following contexts can be analyzed from environment information. Note that Table 1 shows only an analysis example of contexts. Furthermore, the context analysis unit 412 may analyze the context on the basis of direct input information of the user as well as the environment information.

TABLE 1

| Context | Environment information |
| --- | --- |
| Working | Position information |
|  | Time information |
| On the way home | Position information (history) |
|  | Time information |
| In a meeting | Application (schedule information) |
| On the train | Position information (history) |
|  | Sensor information (motion, sound) |
|  | Geomagnetic sensor (orientation) |
| Manipulating specific application | Application |
| During talking to another user/group | Application |
| Sleeping | Time information |
|  | Sensor information (motion, posture, sound, whether or not small terminal 100 is mounted) |

The information regarding the context obtained by the analysis of the context analysis unit 412 is output to the grouping processing unit 413. Note that, for example, the small terminal 100 or the mobile terminal 200 may have such a function by the context analysis unit 412. In this case, for example, any one of the small terminal 100 or the mobile terminal 200 may analyze the context of the user who uses the small terminal 100 or the mobile terminal 200 from the environment information acquired by the small terminal 100 and the mobile terminal 200 to acquire the information regarding the context.

(Grouping Processing Unit)

The grouping processing unit 413 has a function of grouping the user terminal on the basis of the environment information regarding the user terminal acquired from the user terminal. Specifically, the grouping processing unit 413 groups the mobile terminal 200 as a talk target on the basis of the environment information regarding the mobile terminal 200 acquired from the mobile terminal 200.

The grouping mentioned here means grouping the mobile terminal 200 used by the user who uses a function or an application executed by the mobile terminal 200 or the server 400 as the talk target. This grouping processing includes processing for generating a group including mobile terminals 200 used by a plurality of users or joining the mobile terminal used by the user in an already generated group.

For example, as illustrated in FIG. 2, the server 400 acquires environment information from the mobile terminals 200A to 200C, and if it is determined that the environment information is similar to each other as an analysis result of the environment information, the grouping processing unit 413 generates a group including the mobile terminals 200A to 200C. Furthermore, in a case where the mobile terminals 200A and 200B are already included in one group, if it is determined that the mobile terminal 200C is related to the one group as an analysis result of the environment information acquired by the server 400 from the mobile terminal 200C, the grouping processing unit 413 joins the mobile terminal 200C in the one group.

Furthermore, the grouping processing of the mobile terminal 200 may be performed on the basis of the environment information obtained within a predetermined time. For example, the grouping processing unit 413 may perform grouping on the basis of only the environment information generated using behavior or an action of the user as a trigger within a predetermined time, in the grouping processing. By using similar environment information generated within the predetermined time, it becomes easy to generate a group intended by the user.

Note that for example, the grouping processing unit 413 may present a generation timing of the environment information to the user by the mobile terminal 200 or the small terminal 100 before starting the grouping processing. More specifically, the grouping processing unit 413 may present a timing at which the environment information is generated to the user by the voice output from the small terminal 100 or the image displayed on the display manipulation unit 280 of the mobile terminal 200. With this configuration, it is possible to perform more reliable grouping.

Furthermore, the grouping processing unit 413 may perform processing for joining any mobile terminal 200 in an existing group on the basis of the environment information appropriately acquired from the mobile terminal 200. With this configuration, it is possible to join the mobile terminal 200 in the existing group at any timing.

Furthermore, the grouping processing of the mobile terminal 200 may be performed on the mobile terminal 200 present within a predetermined space. For example, the grouping processing unit 413 may perform the grouping on the basis of only environment information obtained from the mobile terminal 200 present within the same space, in the grouping processing. With this configuration, it becomes easy to generate the group intended by the user.

Furthermore, the grouping processing unit 413 may perform the grouping processing regardless of a position or a place at which the mobile terminal 200 is present. With this configuration, it is possible to join the mobile terminal 200 in the existing group at any timing.

Note that the grouping processing unit 413 may present information indicating whether to generate the group or join the mobile terminal 200 in the existing group to the user who uses the mobile terminal 200 before generating the group including the mobile terminal 200 or joining the mobile terminal 200 in the existing group. With this configuration, it is possible to prevent generation of an unintended group and joining of the mobile terminal in an unintended group.

Furthermore, the grouping processing unit 413 may limit a target mobile terminal 200 to be grouped in advance. With this configuration, it is possible to prevent a mobile terminal 200 related to an unintended user from joining the group. For example, the target to be grouped may be limited to the mobile terminal 200 related to a contact number included in a contact number database of the mobile terminal 200.

Furthermore, the grouping processing unit 413 may perform the grouping processing on the basis of the information regarding the context obtained by the analysis of the context analysis unit 412.

Note that a specific example of the grouping processing will be described later.

Furthermore, the environment information regarding the user terminal includes the sensor information, the image information, and the position information described above. In other words, the environment information regarding the user terminal means spatial or temporal information acquired by the sensors, the microphone, the various modules, and the like, provided in the mobile terminal 200 or the small terminal 100. The image information is image information obtained by the user terminal (the mobile terminal 200) capturing an image of a subject present around the mobile terminal 200, and thus corresponds to the environment information regarding the user terminal. Furthermore, such environment information can also include time information. Furthermore, such environment information can also include information such as functions or applications installed in the small terminal 100 or the mobile terminal 200. Such information includes contents included in the functions or the applications or information regarding start states of the functions or the applications.

Note that the environment information regarding the user terminal does not include information (for example, character information directly input to the display manipulation unit 280 or manipulation information by touch, swipe, slide, or the like) directly input and generated by the user touching or approaching the display manipulation unit 280.

(Communication Control Unit)

The communication control unit 414 has a function of controlling processing related to voice communication. Specifically, the communication control unit 414 controls processing related to voice communication between the plurality of mobile terminals 200.

For example, the communication control unit 414 performs processing for constructing voice communication between the mobile terminals 200 in the group grouped by the grouping processing unit 413. With such processing, it is possible to talk between users who use the mobile terminals 200 included in the same group.

Note that a specific processing example by the communication control unit 414 will be described in a second embodiment of the present disclosure.

<2.2. Processing Example of Server>

Figure 4:
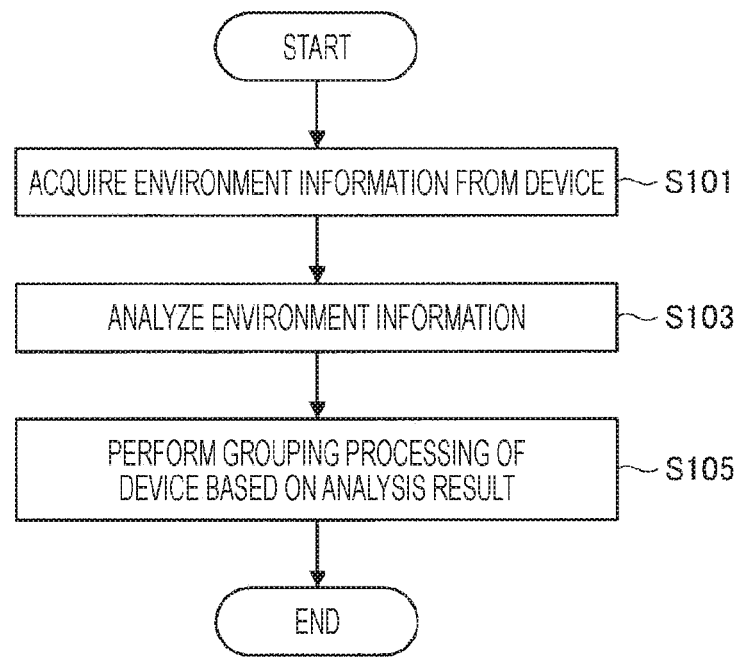
FIG. 4 is a flowchart illustrating an example of a flow of processing of a server according to the first embodiment.

Next, a processing example of the server 400 according to the first embodiment of the present disclosure will be described. FIG. 4 is a flowchart illustrating an example of a flow of processing of the server 400 according to the present embodiment.

As illustrated in FIG. 4, the server 400 first acquires the environment information from the device (step S101). Specifically, the communication unit 420 acquires the environment information such as the sensor information from the mobile terminal 200.

Next, the server 400 analyzes the acquired environment information (step S103). Specifically, the information analysis unit 411 analyzes the sensor information and the like acquired from the mobile terminal 200, and outputs an analysis result to the grouping processing unit 413.

Next, the server 400 performs grouping processing of the device on the basis of the analysis result (step S105). Specifically, the grouping processing unit 413 groups the mobile terminal 200 on the basis of the analysis result of the sensor information and the like by the information analysis unit 411. Furthermore, the communication control unit 414 constructs the voice communication between the mobile terminals 200 included in the group generated or edited by the grouping processing.

<2.3. Grouping Processing Example>

Next, a specific example of the grouping processing by the grouping processing unit 413 will be described.

(Grouping Processing by Detecting Similar Sound)

For example, the grouping processing may be performed by detecting similar sounds. Specifically, in a case where analysis results of information regarding sounds acquired from the plurality of mobile terminals 200 are similar to each other (that is, similar sounds are detected), the grouping processing unit 413 may group the mobile terminals 200 transmitting information regarding the sounds into the same group.

For example, in a case where a plurality of users having the mobile terminals 200 is present in the same space (a predetermined space), it is assumed that the users have uttered the same phrase (for example, "cheers" or the like) substantially at the same time. In this case, the mobile terminals 200 (or the small terminals 100) first acquire voice information based on the utterance, and the server 400 acquires the voice information from each of the mobile terminals 200. Then, if it is determined by the information analysis unit 411 that the voice information is similar to each other as an analysis of the voice information, the respective mobile terminals 200 possessed by these users are grouped into the same group.

Note that for example, a catchphrase, applause, or specific music may be used, instead of the utterance of the users described above. A type and a content of sounds used in the grouping processing are not particularly limited as long as voices are easily detected as similar sounds.

(Grouping Processing by Capturing Image of Similar Subject)

Furthermore, for example, the grouping processing may be performed by capturing images of similar subjects. Specifically, in a case where analysis results of image information acquired from the plurality of mobile terminals 200 are similar to each other (that is, images of similar subjects are captured), the grouping processing unit 413 may group the mobile terminals 200 transmitting such image information into the same group.

Note that the similar subjects described above may be, for example, user's faces, landmarks, symbol marks, or the like. Furthermore, the similar subjects may not be necessarily the same subjects. For example, the grouping processing unit 413 may perform the grouping on the basis of image information in which food provided in a predetermined store is a subject. With this configuration, it is possible to generate a group for the food.

Furthermore, in the grouping processing, a generation timing of the image information used as the environment information is not particularly limited. For example, the grouping processing unit 413 may perform the grouping processing on one group on the basis of image information obtained by capturing the images of the similar subjects within a predetermined time. Furthermore, the grouping processing unit 413 may perform the grouping processing on one group on the basis of the image information obtained by capturing the images of the similar subjects regardless of an image capturing timing.

(Grouping Processing by Detecting Similar Gestures)

Furthermore, for example, the grouping processing may be performed by detecting similar gestures. Specifically, in a case where analysis results of sensor information acquired from the plurality of mobile terminals 200 and detected and obtained by the acceleration sensors 231 or the gyro sensors 232 are similar to each other (that is, images of similar gestures are detected), the grouping processing unit 413 may group mobile terminals 200 transmitting such sensor information into the same group.

Figure 5:
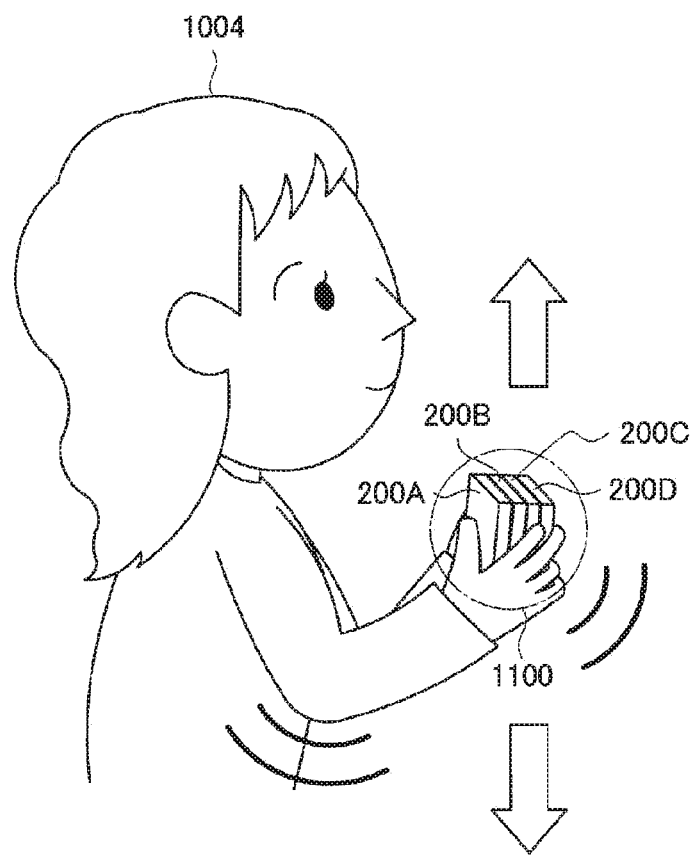
FIG. 5 is a schematic view illustrating a first example of grouping processing based on a gesture.
Figure 6:
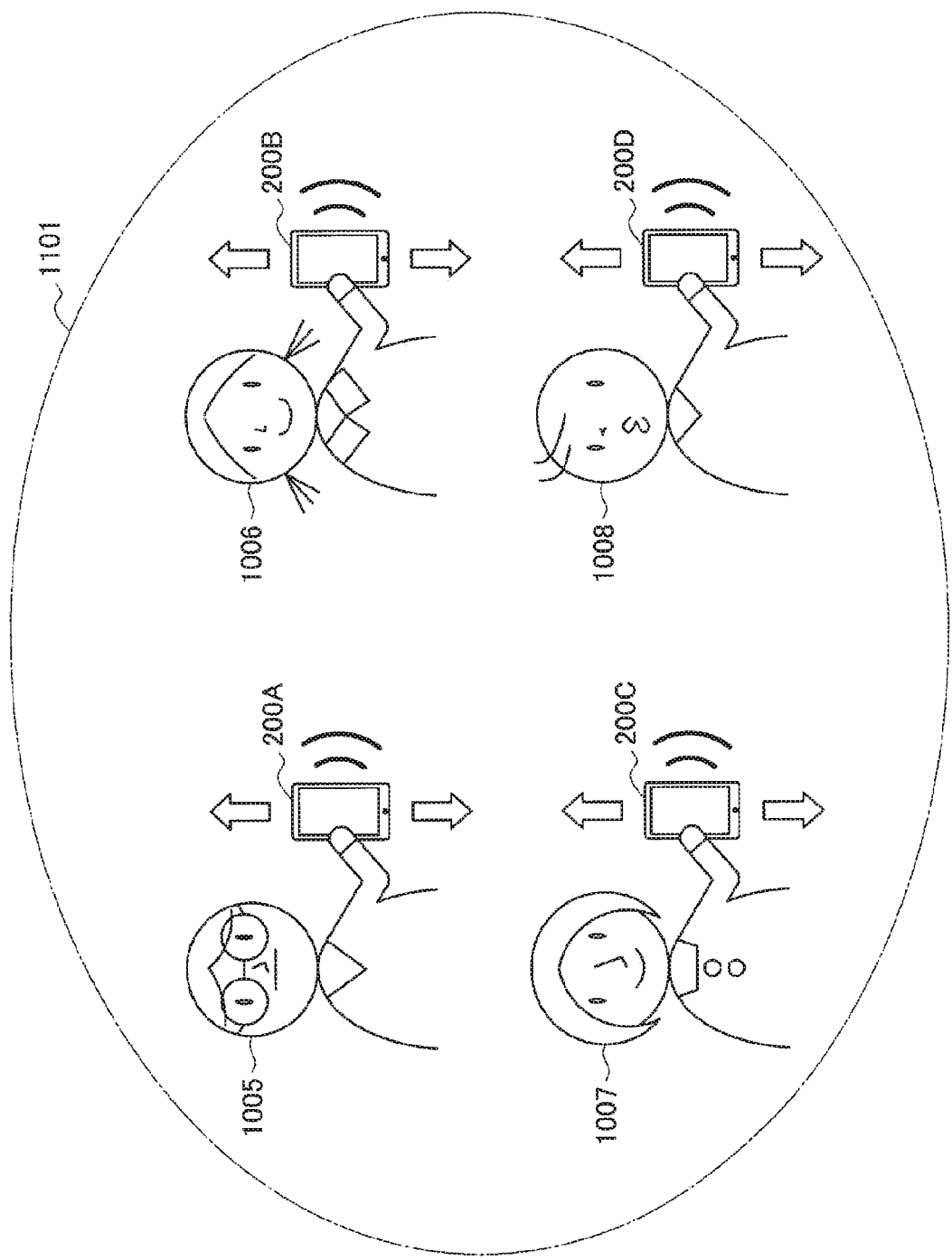
FIG. 6 is a schematic view illustrating a second example of grouping processing based on a gesture.

FIGS. 5 and 6 are schematic views illustrating examples of grouping processing based on a gesture. First, referring to FIG. 5, one user 1004 holds a plurality of mobile terminals 200A to 200D. Then, the user 1004 shakes the mobile terminals 200A to 200D while holding the mobile terminals 200A to 200D. This shaking action is a gesture.

In that case, all of the mobile terminals 200A to 200D detect similar motions by the acceleration sensors 231 or the like. In this state, when each of the mobile terminals 200A to 200D transmits the detected sensor information to the server 400, it is analyzed by the information analysis unit 411 that the sensor information is similar to each other. In this case, the grouping processing unit 413 groups the mobile terminals 200A to 200D into the same group 1100 (denoted by a broken line region in FIG. 5). Therefore, only by shaking the mobile terminals 200A to 200D, the mobile terminals 200A to 200D can be easily grouped.

Furthermore, referring to FIG. 6, users 1005 to 1008 hold mobile terminals 200A to 200D, respectively, in a state where they are close to one another. Then, the users 1005 to 1008 shake the mobile terminals 200A to 200D at substantially the same time (within a predetermined time) while holding the mobile terminals 200A to 200D.

In that case, all of the mobile terminals 200A to 200D detect similar motions by the acceleration sensors 231 or the like, similarly as described above. In this state, when each of the mobile terminals 200A to 200D transmits the detected sensor information to the server 400, it is analyzed by the information analysis unit 411 that the sensor information is similar to each other. In this case, the grouping processing unit 413 groups the mobile terminals 200A to 200D into the same group 1101 (denoted by a broken line region in FIG. 6). Therefore, only by shaking the mobile terminals 200A to 200D, the mobile terminals 200A to 200D can be easily grouped.

Note that motions of the similar gestures described above are not particularly limited. Furthermore, in the grouping processing, a generation timing of the sensor information used as the environment information is not particularly limited. For example, the grouping processing unit 413 may perform the grouping processing on one group on the basis of sensor information obtained by detecting the similar gestures within a predetermined time. Furthermore, the grouping processing unit 413 may perform the grouping processing on one group on the basis of the sensor information obtained by detecting the similar gestures regardless of a gesture timing.

(Grouping Processing Based on History of Environment Information)

Furthermore, for example, the grouping processing may be performed on the basis of a history of the environment information. Specifically, in a case where analysis results of histories of environment information acquired from the plurality of mobile terminals 200 are similar to each other (that is, similar histories of the environment information are obtained), the grouping processing unit 413 may group mobile terminals 200 transmitting such environment information into the same group.

For example, the grouping processing unit 413 may perform the grouping processing on the basis of the histories of the position information acquired from the plurality of mobile terminals 200. If it is determined from the histories of the position information that the plurality of mobile terminals 200 is continuously in an approach state, the grouping processing unit 413 may group the mobile terminals 200 into the same group. Furthermore, the grouping processing unit 413 may perform the grouping processing on the basis of histories of approach information obtained by near field communication, in addition to the position information. With this configuration, it is possible to group the mobile terminals 200 of users who are close to each other without requiring utterance, gestures, or the like by the users.

Furthermore, the grouping processing unit 413 may perform the grouping processing on the basis of a history of sensor information obtained from an environmental sensor installed in a predetermined space such as a room. With this configuration, it is possible to group the mobile terminals 200 of users who are present in the same environment without requiring the utterance, the gestures or the like by the users.

(Grouping Processing Based on Information Regarding Context)

Figure 7:
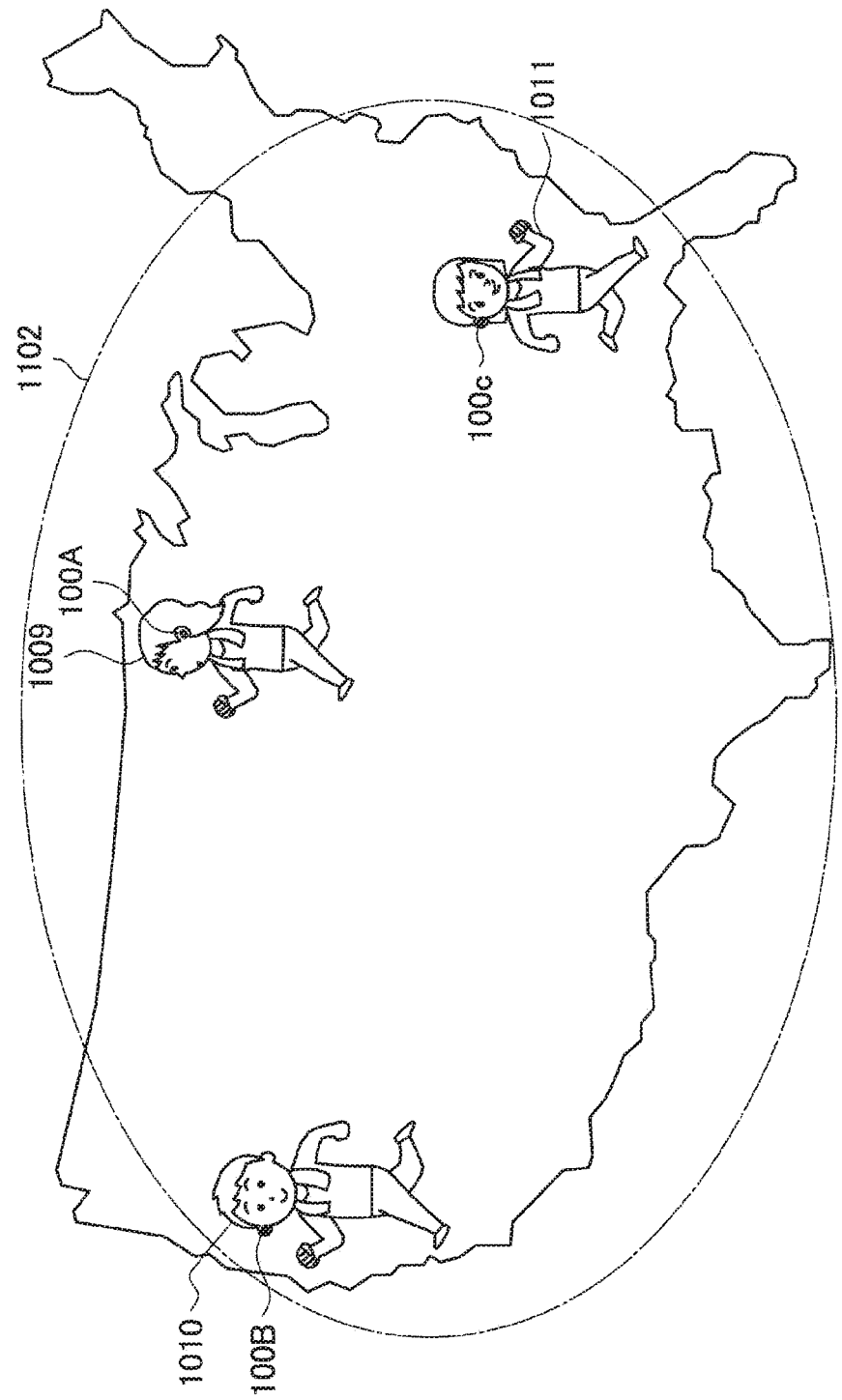
FIG. 7 is a schematic view illustrating an example of grouping processing based on information regarding a context by a grouping processing unit according to the first embodiment.

Furthermore, for example, the grouping processing may be performed on the basis of the information regarding the context. FIG. 7 is a schematic view illustrating an example of grouping processing based on information regarding a context by the grouping processing unit 413 according to the present embodiment. As illustrated in FIG. 7, for example, it is assumed that users 1009 to 1011 (the respective users possess mobile terminals 200A to 200C (not illustrated)) each wearing small terminals 100A to 100C are running.

In this case, the context analysis unit 412 first analyzes a context of each user from environment information (including the information analyzed by the information analysis unit 411) acquired from each of the mobile terminals 200A to 200C. In this case, the context analysis unit 412 analyzes that each user is running. Such information is output to the grouping processing unit 413.

Then, the grouping processing unit 413 groups the mobile terminals 200A to 200C related to each user who is analyzed to be running into the same group 1102. With this configuration, as illustrated in FIG. 7, the users 1009 to 1011 who are running at remote places can be connected to each other only by doing the running to talk to one another.

Figure 8:
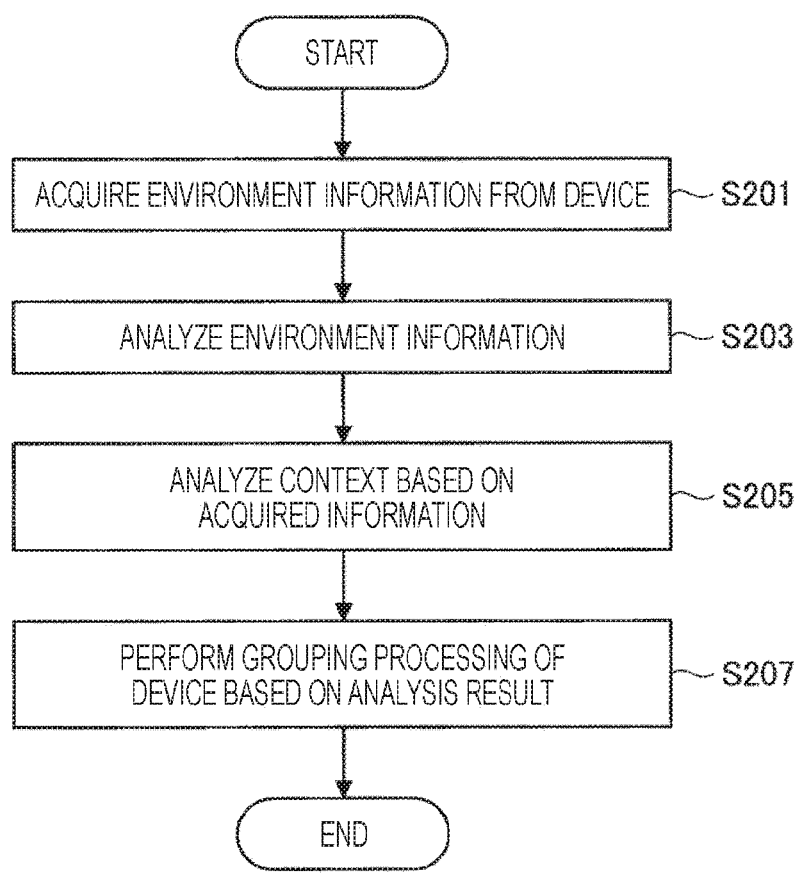
FIG. 8 is a flowchart illustrating another example of a flow of processing of a server according to the first embodiment.

Here, a flow of processing in the server 400 in a case of performing the grouping processing based on the information regarding the context will be described. FIG. 8 is a flowchart illustrating another example of a flow of processing of the server 400 according to the present embodiment.

As illustrated in FIG. 8, the server 400 first acquires the environment information from the device (step S201). Specifically, the communication unit 420 acquires the environment information such as the sensor information from the mobile terminal 200.

Next, the server 400 analyzes the acquired environment information (step S203). Specifically, the information analysis unit 411 analyzes the sensor information and the like acquired from the mobile terminal 200, and outputs an analysis result to the context analysis unit 412 and the grouping processing unit 413.

Next, the server 400 analyzes the context from the environment information and the analysis result of the environment information (step S205). Specifically, the context analysis unit 412 analyzes the analysis result acquired from the information analysis unit 411, the sensor information acquired from the mobile terminal 200, and the like, to analyze the context of the user who possesses the mobile terminal 200. Then, the context analysis unit 412 outputs information regarding the context, which is an analysis result of the context, to the grouping processing unit 413.

Next, the server 400 performs grouping processing of the device on the basis of the information regarding the context (step S207). Specifically, the grouping processing unit 413 groups the mobile terminal 200 on the basis of the analysis result of the context by the context analysis unit 412. Furthermore, the communication control unit 414 constructs the voice communication between the mobile terminals 200 included in the group generated or edited by the grouping processing.

(Generation of Group Name)

Furthermore, the grouping processing unit 413 may generate identification information of the group on the basis of the environment information, the group being generated by the grouping processing. The identification information mentioned here includes, for example, a name of the group.

The name of the group may be a name related to, for example, the environment information used for the grouping processing. Specifically, in a case where the grouping processing is performed on the basis of the information regarding the context, the name of the group may be a name related to the context. For example, in a case where the grouping processing is performed on the basis of a context indicating that the user is running, the name of the group may be a "running group" or the like. With this case, the user having the grouped mobile terminal 200 easily grasps an attribute of the group to which the mobile terminal 200 possessed by the user belongs, without setting the name of the group.

As described above, in the information processing system 1 according to the present embodiment, the grouping processing of the plurality of mobile terminals 200 is performed on the basis of the environment information. With this configuration, the user can easily create a group or join a group without creating or designating a group of a talk target that he/she wants to participate by inputting characters or the like. Therefore, it is possible to reduce a burden on the user due to the grouping of the talk target.

Furthermore, in the information processing system 1 according to the present embodiment, the grouping processing can be performed on the basis of the context obtained from the environment information. With this configuration, the user is automatically assigned to the group of the talk target. Therefore, it is possible to further reduce the burden on the user due to the grouping of the talk target.

Note that the group according to the present embodiment means a group of a talk target participating in the voice communication performed by the plurality of users in the information processing system 1, but the group grouped by the grouping processing unit 413 is not limited to the group for the voice communication among a plurality of such users. For example, a group or the like related to a social networking service, a chat by text, a mailing list, or the like, can also be a target of the grouping processing by the grouping processing unit 413.

The first embodiment of the present disclosure has been described hereinabove.

3. Second Embodiment

Next, a second embodiment of the present disclosure will be described. In the present embodiment, in addition to the grouping processing according to the above embodiment, an example of processing related to voice communication by a communication control unit will be described. The voice communication mentioned here means voice communication constructed between one-to-one users and voice communication constructed within a group including a plurality of users. In such voice communication, the plurality of users can talk to one another.

Note that since a configuration of an information processing system 1 according to the present embodiment is the same as that of the information processing system 1 according to the above embodiment, a description of such a configuration is omitted. Furthermore, analysis results obtained by the information analysis unit 411 and the context analysis unit 412 are output to the communication control unit 414.

The communication control unit 414 according to the present embodiment can control processing related to voice communication on the basis of environment information regarding a user terminal. The environment information mentioned here includes sensor information, image information, position information, time information, contents included in functions or applications, information regarding start states of the functions or applications, or the like, as described in the above embodiment. Furthermore, sensor information obtained from the small terminal 100 worn by the user corresponds to third sensor information detected and obtained by a device attached to or worn by the user. Furthermore, the communication control unit 414 according to the present embodiment may control processing related to voice communication on the basis of information regarding a context of the user who uses the user terminal, the information regarding the context of the user being obtained from the environment information.

Hereinafter, start processing of the voice communication, selection processing of a talk target, and voice output processing in voice communication with the talk target will be described as an example of processing related to voice communication.

<3.1. Start Processing of Voice Communication>

The communication control unit 414 according to the present embodiment performs, for example, processing related to the start of voice communication. The processing related to the start of the voice communication refers to processing for switching voice communication among the plurality of users to a valid state. In general, the voice communication is preferably valid only when any one of the plurality of users is talking, in terms of traffic. Therefore, the communication control unit 414 according to the present embodiment sets the voice communication to an idle state in a case where the user is not talking, and performs the processing related to the start of such voice communication in a case where predetermined information is input as a trigger.

For example, the communication control unit 414 may control processing related to the start of the voice communication on the basis of analysis information of a voice input in the voice communication. Specifically, the information analysis unit 411 first performs voiceprint analysis on a voice input to the small terminal 100 or the mobile terminal 200. Then, the communication control unit 414 performs processing for starting the voice communication in a case where the input voice is a voice of the user who possesses the small terminal 100 or the mobile terminal 200 as an analysis result. A known technology regarding voiceprint analysis can be used as such voiceprint analysis.

Figure 9:
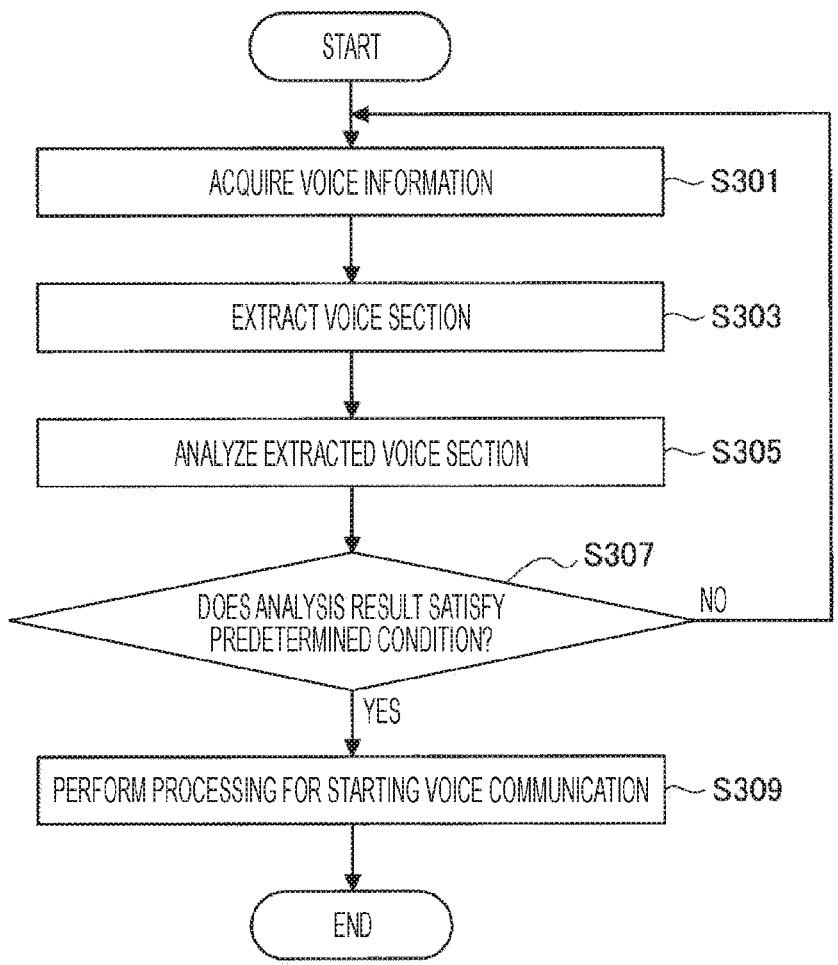
FIG. 9 is a flowchart illustrating an example of a flow of processing related to the start of voice communication according to a second embodiment of the present disclosure.

FIG. 9 is a flowchart illustrating an example of a flow of processing related to the start of the voice communication according to the present embodiment. As illustrated in FIG. 9, the server 400 first acquires voice information (step S301). Specifically, the communication unit 420 acquires the voice information from the mobile terminal 200.

Next, the server 400 detects a voice section (step S303). Specifically, the information analysis unit 411 distinguishes between a voice section (a section recognized as a voice) and a section other than the voice section from a time-series voice signal included in the voice information, and extracts only the voice section.

Next, the server 400 analyzes the extracted voice section (step S305). Specifically, the information analysis unit 411 performs voiceprint analysis on the extracted voice section. A result of the voiceprint analysis is output to the communication control unit 414.

Next, the server 400 decides whether or not the analysis result satisfies a predetermined condition (step S307). Specifically, the communication control unit 414 decides whether or not the input voice is a voice uttered by the user. In a case where it is decided that the input voice is the voice uttered by the user (YES in step S307), the communication control unit 414 performs the processing for starting the voice communication (step S309). On the other hand, in a case where it is decided that the input voice is not the voice uttered by the user (NO in step S307), the communication control unit 414 allows the voice communication to remain in an idle state without performing the processing for starting the voice communication.

As described above, it is possible to start the voice communication on the basis of the utterance of the user by extracting the voice section and performing the voiceprint analysis on the extracted voice section. In that case, for example, even if a noise or a voice of another person enters the speaker of the small terminal 100 or the like, it is possible to prevent the voice communication from being automatically started.

Furthermore, the communication control unit 414 may control the processing related to the start of the voice communication on the basis of an analysis result of a sound source position. Specifically, the information analysis unit 411 first analyzes a sound source position of the voice input to the small terminal 100 or the mobile terminal 200. Such a sound source position can be analyzed by a known method on the basis of, for example, a plurality of voice information obtained by a plurality of speakers provided in the small terminal 100 or the like. Then, the communication control unit 414 performs the processing for starting the voice communication in a case where it is determined that the input sound source position is a mouth of the user who possesses the small terminal 100 or the mobile terminal 200 as an analysis result of the sound source position. With this configuration, it is possible to start the voice communication on the basis of utterance of the user.

Furthermore, the communication control unit 414 may control the processing related to the start of the voice communication on the basis of an analysis result of a content included in the voice information. Specifically, the information analysis unit 411 first analyzes a content of the voice input to the small terminal 100 or the mobile terminal 200. Then, the communication control unit 414 performs the processing for starting the voice communication in a case where it is determined that the input voice includes a predetermined content as an analysis result of the content of the voice.

Figure 10:
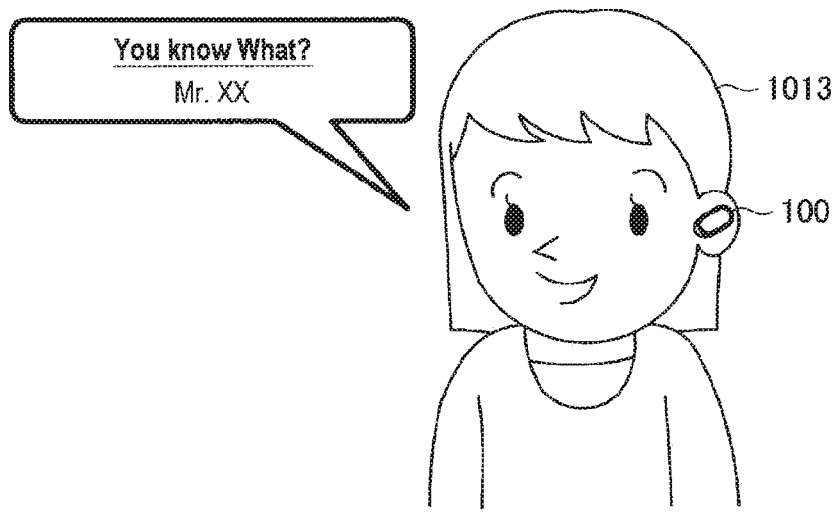
FIG. 10 is a schematic view illustrating an example of processing related to the start of voice communication based on an analysis result of a content included in voice information according to the second embodiment.

FIG. 10 is a schematic view illustrating an example of processing related to the start of voice communication based on an analysis result of a content included in voice information according to the present embodiment. As illustrated in FIG. 10, it is assumed that a user 1013 wearing the small terminal 100 have uttered "You Know What. Mr. XX". This "You Know What?" is a phrase of a trigger related to the start of the voice communication. In that case, the information analysis unit 411 analyzes voice information based on utterance of the user 1013, and determines that a phrase which is a trigger is included in such voice information. The communication control unit 414 performs processing for starting the voice communication from a determination result indicating that the phrase which is the trigger is included. With this configuration, the user can easily start the voice communication only by uttering a specific word. Note that the phrase which is the trigger is not particularly limited.

Furthermore, a phrase corresponding to a user, a group or the like that is a talk target may be preset as a trigger. With this configuration, it is possible to not only start the voice communication, but also easily select the talk target of the voice communication.

Note that the processing based on the voiceprint analysis or the analysis of the sound source position described above is not limited to the processing related to the start of the voice communication. For example, the processing or the analysis can also be used for releasing or enabling security in using a service using the small terminal 100 or the mobile terminal 200.

Furthermore, the communication control unit 414 may perform the processing related to the start of the voice communication on the basis of, for example, information regarding a worn state of the small terminal 100, obtained from the proximity sensor 131 provided in the small terminal 100. Specifically, when the small terminal 100 is worn on the user's ear, the proximity sensor 131 detects the worn state of the small terminal 100. Therefore, the communication control unit 414 performs the processing for starting the voice communication on the basis of detected information indicating that the small terminal 100 has been worn. With this configuration, the user can immediately start a talk in the voice communication as soon as he/she wears the small terminal 100.

Furthermore, the communication control unit 414 may perform the processing related to the start of the voice communication on the basis of, for example, information regarding the context of the user who possesses the mobile terminal 200. Specifically, the communication control unit 414 performs the processing for starting the voice communication in a case where information regarding a context indicating that the user is in a situation in which he/she can talk (for example, in a case where a meeting is over) is obtained. With this configuration, when the user is in the situation in which it is possible for the user to talk, it is possible for the user to immediately start talk.

<3.2. Selection Processing of Talk Target>

Furthermore, the communication control unit 414 according to the present embodiment performs, for example, processing related to selection of a talk target of the voice communication. The processing related to the selection of the talk target of the voice communication refers to processing for selecting any one of one user or a group including a plurality of users that is the talk target and constructing voice communication between a mobile terminal 200 of a user himself/herself and a mobile terminal 200 in the selected user or group. The communication control unit 414 according to the present embodiment performs the processing for selecting the talk target on the basis of, for example, the voice information in the voice communication, the environment information such as the sensor information, the information regarding the context obtained from the environment information, or the like. Note that since the processing for selecting the talk target based on the voice information has been described above, processing for selecting the talk target based on the environment information and the information regarding the context will hereinafter be described.

(Selection Processing of Talk Target Based on Environment Information)

For example, the communication control unit 414 may control the processing for selecting the talk target on the basis of the sensor information obtained from the small terminal 100 or the like. Specifically, the information analysis unit 411 first analyzes the sensor information obtained from the small terminal 100 or the like. Then, the communication control unit 414 selects the talk target on the basis of an analysis result of the environment information.

The environment information mentioned here is, for example, the sensor information. Such sensor information includes, for example, information regarding the motion, the azimuth, or the posture of the small terminal 100, obtained from the acceleration sensor 132, the gyro sensor 133, the geomagnetic sensor 135, or the like included in the small terminal 100. In that case, the communication control unit 414 selects the talk target according to the motion, the azimuth, or the posture of the small terminal 100. In other words, the user wearing the small terminal 100 can select the talk target depending on a direction of his/her head or body.

Figure 11:
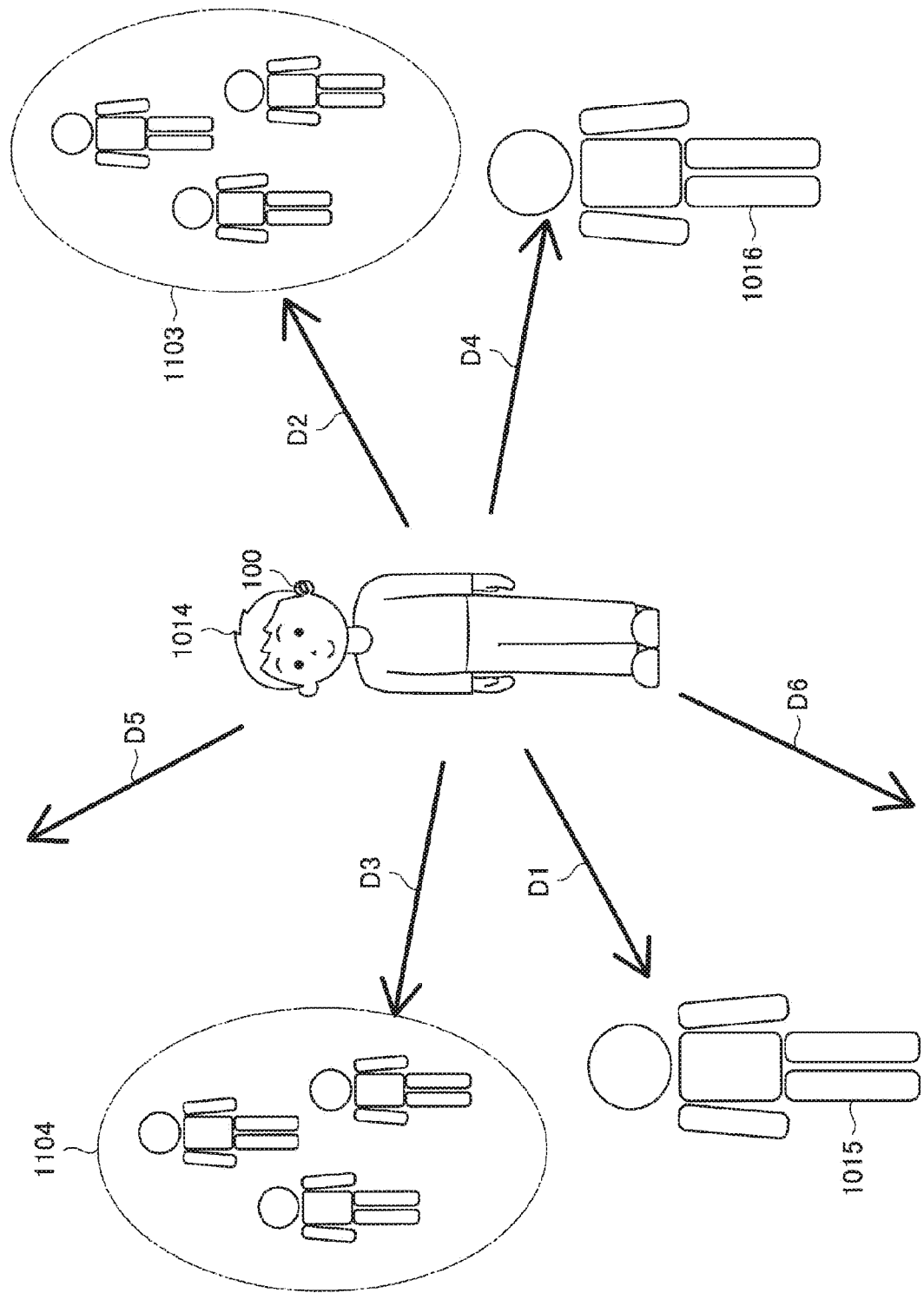
FIG. 11 is a schematic view illustrating a first example of selection processing of a talk target based on a direction of a user according to the second embodiment.

FIG. 11 is a schematic view illustrating a first example of selection processing of a talk target based on a direction of a user according to the present embodiment. As illustrated in FIG. 11, a user 1014 is wearing the small terminal 100. In this case, a direction of a head of the user 1014 is detected by the acceleration sensor 132, the gyro sensor 133, the geomagnetic sensor 135, or the like provided in the small terminal 100. For example, in a case where the user 1014 faces a forward direction D1, the communication control unit 414 can select a user 1015 as the talk target on the basis of detected information indicating that the direction the head of the user 1014 is the forward direction D1. Similarly, in a case where the user 1014 faces a backward direction D2, a group 1103 can be selected as the talk target. Furthermore, in a case where the user 1014 faces a rightward direction D3, a group 1104 can be selected as the talk target. Furthermore, in a case where the user 1014 faces a leftward direction D4, a user 1016 can be selected as the talk target.

For example, if talk targets corresponding to orientations D1 to D4 based on the user 1014 are determined in advance, the talk target can be selected depending on the direction of the head of the user 1014. Therefore, the user 1014 can easily talk to a desired talk target by uttering a word while facing a predetermined direction.

Furthermore, as illustrated in FIG. 11, it is also possible to select a talk target corresponding to a case where the direction of the head of the user 1014 is an upward direction D5 or a downward direction D6.

Furthermore, the talk target may be selected depending on a position of the talk target and a position and a direction of the user. For example, in a case where the user 1014 faces the forward direction D1 and the user 1015 is present in the forward direction D1, the communication control unit 414 can select the user 1015 as the talk target. Similarly, in a case where the user 1014 faces the backward direction D2 and the group 1103 is present in the backward direction D2, the group 1103 can be selected as the talk target. Furthermore, in a case where the user 1014 faces the rightward direction D3 and the group 1104 is present in the rightward direction D3, the group 1104 can be selected as the talk target. Furthermore, in a case where the user 1014 faces the leftward direction D4 and the user 1016 is present in the leftward direction, the user 1016 can be selected as the talk target.

Furthermore, in a case where the user 1014 faces the upward direction D5 or the downward direction D6 and other users or groups are present in the upward direction D5 or the downward direction D6, other users or groups may be selected as the talk target. Furthermore, in a case where a plurality of users or groups is present in the same orientation in a horizontal direction when viewed from the user, the communication control unit 414 may select any one of these users or groups as the talk target depending on an elevation angle (an upward direction or a downward direction) of a head of the user.

Figure 12:
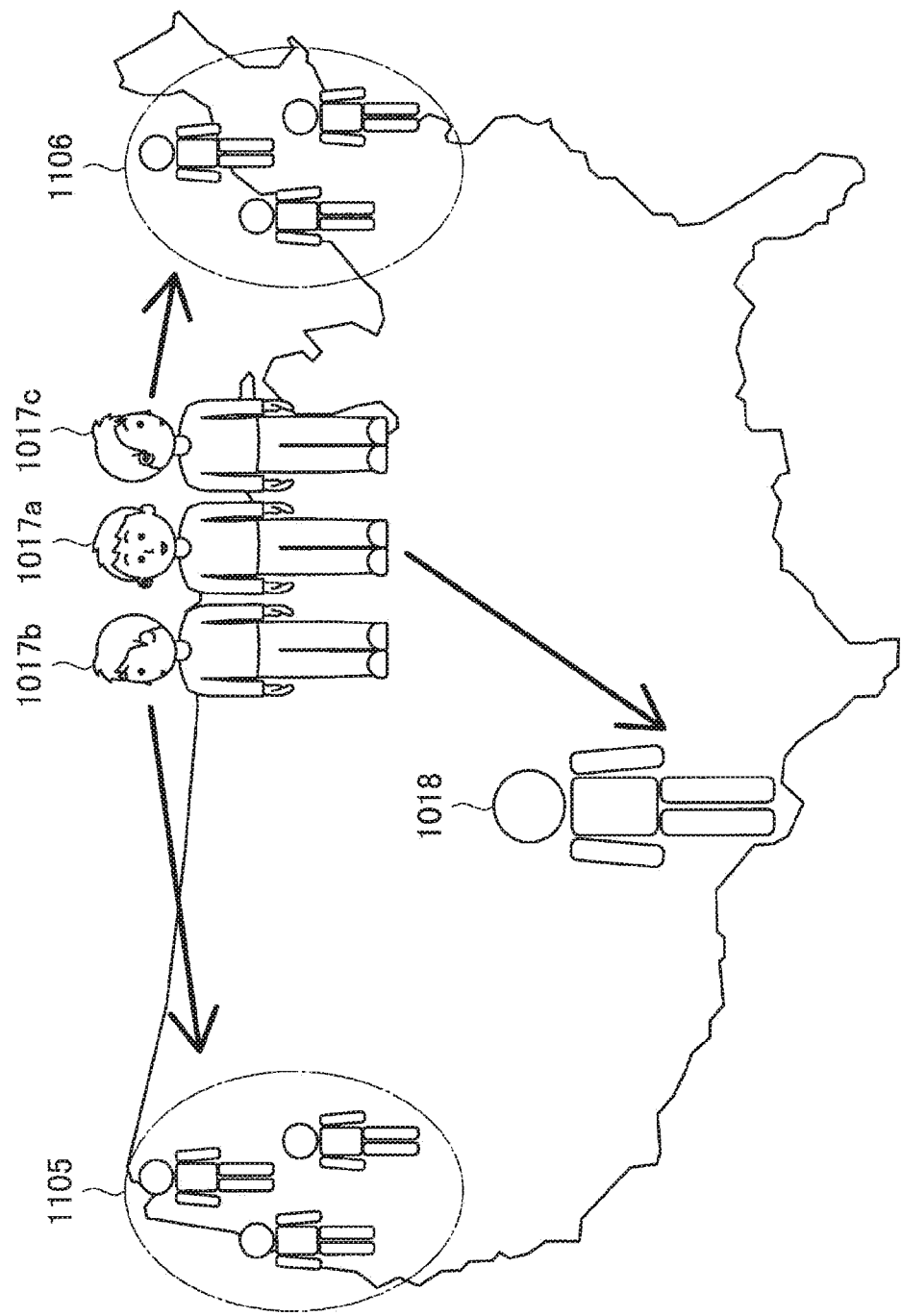
FIG. 12 is a schematic view illustrating a second example of selection processing of a talk target based on a direction of a user according to the second embodiment.

Such selection processing is not limited to processing for setting a user or a group present in the vicinity to the talk target. FIG. 12 is a schematic view illustrating a second example of selection processing of a talk target based on a direction of a user according to the present embodiment. As illustrated in FIG. 12, for example, it is assumed that a user 1017 is located in the Midwest of the United States, a group 1105 is located in the Northwest of the United States, a user 1018 is located in the South of the United States, and a group 1106 is located in the East of the United States. In this case, the communication control unit 414 performs processing for selecting the talk target on the basis of position information of mobile terminals 200 possessed by the users 1017 and 1018 and the groups 1105 and 1106 and sensor information of a small terminal 100 worn by the user 1017. Specifically, in a case where a user 1017*a* faces the south, the user 1018 can be selected as the talk target. Furthermore, in a case where a user 1017*b* faces the west, the group 1105 can be selected as the talk target. Furthermore, in a case where a user 1017*c* faces the east, the group 1106 can be selected as the talk target.

As described above, by using the position information of the mobile terminals 200 or the like of the user himself/herself and the talk target together with the direction of the user, it is possible to more intuitively select the talk target.

Furthermore, such sensor information may be, for example, biometric information obtained from the biometric authentication sensor 134 provided in the small terminal 100. In this case, the communication control unit 414 may select the talk target on the basis of the biometric information obtained from the biometric authentication sensor 134.

Figure 13:
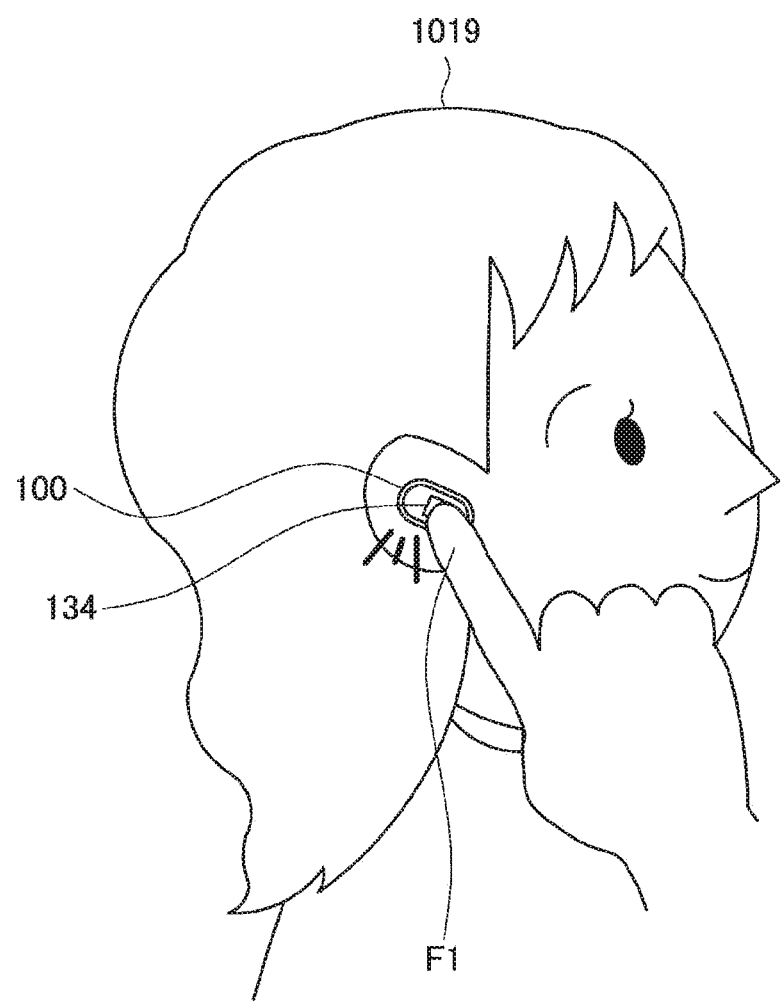
FIG. 13 is a schematic view illustrating an example of selection processing of a talk target based on biometric information according to the second embodiment.

FIG. 13 is a schematic view illustrating an example of selection processing of a talk target based on biometric information according to the present embodiment. As illustrated in FIG. 13, a user 1019 presses a finger F1 against a biometric authentication sensor 134 (fingerprint sensor) of a small terminal 100 worn on his/her ear. In that case, the biometric authentication sensor 134 detects a fingerprint of the finger F1, and the detected information is transmitted as the biometric information from the small terminal 100 to the server 400. Here, it is assumed that the biometric information includes information indicating that the finger F1 is a forefinger F1 of a right hand of the user 1019. In that case, the communication control unit 414 selects a talk target corresponding to the forefinger F1 of the right hand of the user 1019 and constructs voice communication with the talk target.

For example, if a talk target corresponding to each finger of the user 1014 is determined in advance, the user 1014 can select the talk target only by pressing the finger corresponding to the talk target against the biometric authentication sensor 134. Therefore, the user 1014 can easily select a desired talk target.

Furthermore, such sensor information may be, for example, sensor information obtained from a device (another device) other than the small terminal 100 and the mobile terminal 200. In this case, the communication control unit 414 may select the talk target on the basis of the sensor information obtained from another device.

Figure 14:
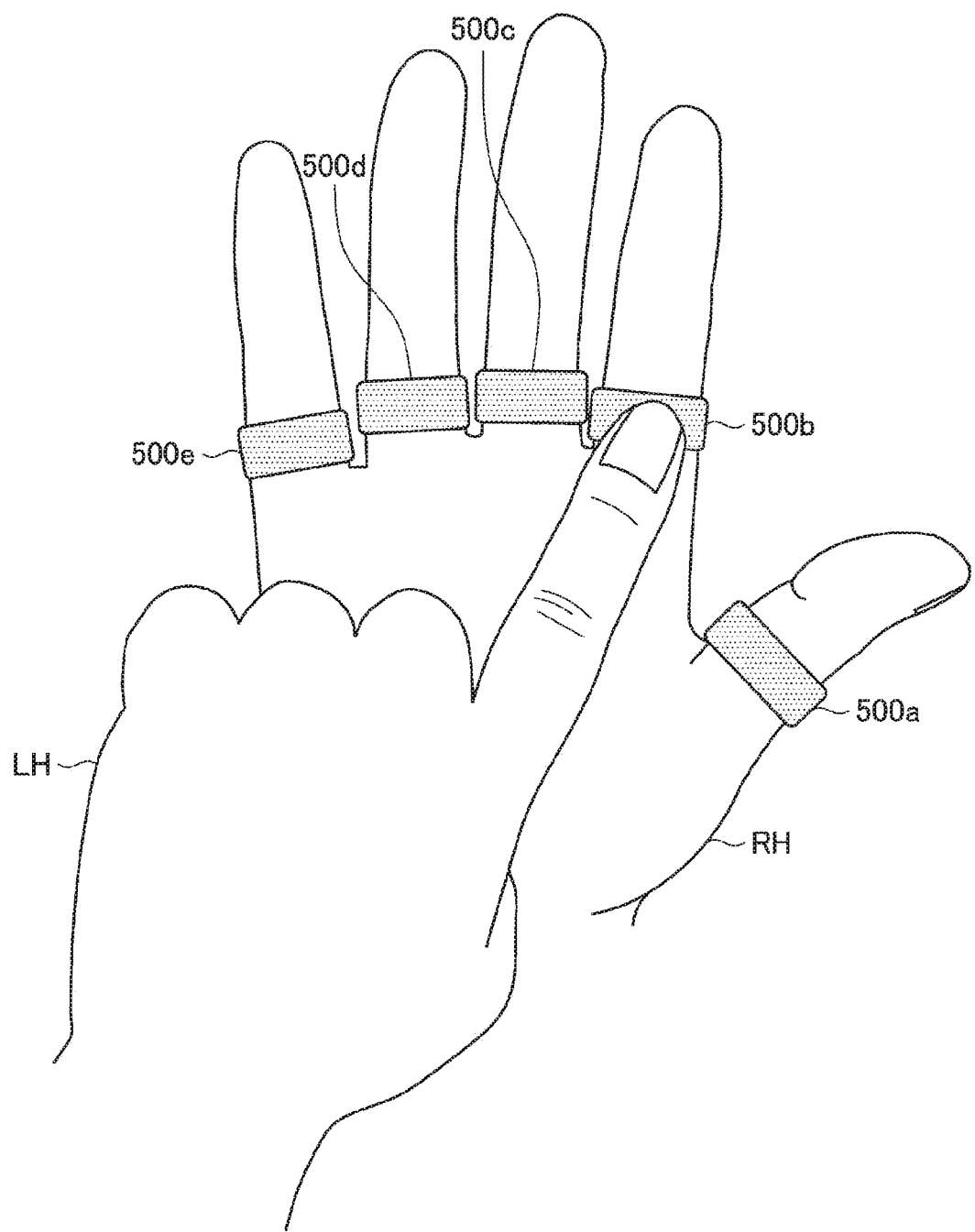
FIG. 14 is a schematic view illustrating an example of selection processing of a talk target based on sensor information obtained from another device according to the second embodiment.

FIG. 14 is a schematic view illustrating an example of selection processing of a talk target based on sensor information obtained from another device according to the present embodiment. As illustrated in FIG. 14, it is assumed that a user wears ring-type devices 500*a* to 500*e* on each finger of his/her right hand RH. In this case, it is assumed that the ring-type device 500*b* worn on a forefinger of the right hand RH has been selected by a left hand LH of the user (for example, by a manipulation such as a manipulation of pressing a button provided on the ring-type device 500*b*). In that case, the ring-type device 500*b* detects the selection, and the detected information is transmitted as the sensor information from the ring-type device 500*b* to the server 400. Communication related to the transmission may be communication from the ring-type device 500*b* through the small terminal 100 or the mobile terminal 200 or may be direct communication between the ring-type device 500*b* and the server 400. In that case, the communication control unit 414 selects a talk target corresponding to the ring-type device 500*b* and constructs voice communication with the talk target.

For example, if a talk target corresponding to the ring-type device 500 worn on each finger of the user is determined in advance, the user can select the talk target only by selecting the ring-type device 500 corresponding to the talk target. Therefore, the user 1014 can easily select a desired talk target.

Note that in the example illustrated in FIG. 14, the ring-type device 500 is worn on each finger of the right hand RH of the user, but the present technology is not limited to such an example. For example, the ring-type device 500 may be worn on only any one of the fingers of the hand of the user, and the talk target may be selected on the basis of information detected by the ring-type device 500 (for example, an operation of the ring-type device 500 or a manipulation on the ring-shaped device 500).

Furthermore, an example in which the ring-type device 500 is used as another device is illustrated in FIG. 14, but the present technology is not limited to such an example. For example, in addition to the ring-type device 500, a bracelet-type device such as a smart watch, a necklace-type device, a device of a type worn on the trunk, a device embedded in the body, or the like, may be used as another device. Furthermore, as the sensor information obtained from another device, any information obtained from a known sensor mountable as another device can be used. Furthermore, in addition to the sensor information, time information, position information or the like may be complexly used.

(Selection Processing of Talk Target Based on Information Regarding Context)

Furthermore, for example, the communication control unit 414 may control the processing for selecting the talk target on the basis of the information regarding the context. Specifically, the context analysis unit 412 first analyzes the context of the user who uses the mobile terminal 200 from the environment information or the like, and outputs the information regarding the context. Then, the communication control unit 414 selects the talk target on the basis of the information regarding the context.

For example, it is assumed that the context analysis unit 412 has analyzed a context indicating that the user who uses the mobile terminal 200 is working from position information indicating that it is daytime on a weekday and position information indicating that the user is at an office. In this case, the communication control unit 414 may select a user or group associated with the work as the talk target. On the other hand, in a case where a context other than the context is analyzed, the communication control unit 414 may select a user or group (for example, a family or the like) associated with privacy as the talk target. With this configuration, it is possible to automatically select a talk target suitable for a situation of the user.

Note that the talk target according to the context may be set by the user in advance, for example. Furthermore, the talk target according to the context may be automatically set, for example, by machine learning or the like based on the past voice communication history of the user and the environment information such as the time information or the position information.

<3.3. Voice Output Processing in Voice Communication with Talk Target>

Furthermore, the communication control unit 414 according to the present embodiment performs, for example, voice output processing in the voice communication with the talk target. The voice output processing in the voice communication with the talk target includes, for example, proxy utterance processing for the talk target in the voice communication. The proxy utterance processing for the communication target in the voice communication refers to processing for transferring a voice including a predetermined content to the talk target instead of the user (in other words, proxy utterance) in a case where it is difficult for the user to utter a word for the talk target. The communication control unit 414 according to the present embodiment performs the proxy utterance processing on the basis of, for example, the environment information such as the sensor information, the context obtained from the environment information, the voice information in the voice communication, and the like.

(Proxy Utterance Processing Based on Environment Information)

For example, the communication control unit 414 may control the proxy utterance processing on the basis of the environment information such as the sensor information obtained from the small terminal 100 or the like. More specifically, the information analysis unit 411 first analyzes the sensor information obtained from the small terminal 100 or the like. Then, the communication control unit 414 performs the proxy utterance processing on the basis of an analysis result of the sensor information.

Such sensor information includes, for example, information regarding the motion of the small terminal 100 and obtained from the acceleration sensor 132, the gyro sensor 133 or the like included in the small terminal 100. In that case, the communication control unit 414 performs the proxy utterance processing by the motion of the small terminal 100. In other words, the user wearing the small terminal 100 can perform the proxy utterance depending on a motion of his/her head.

Figure 15:
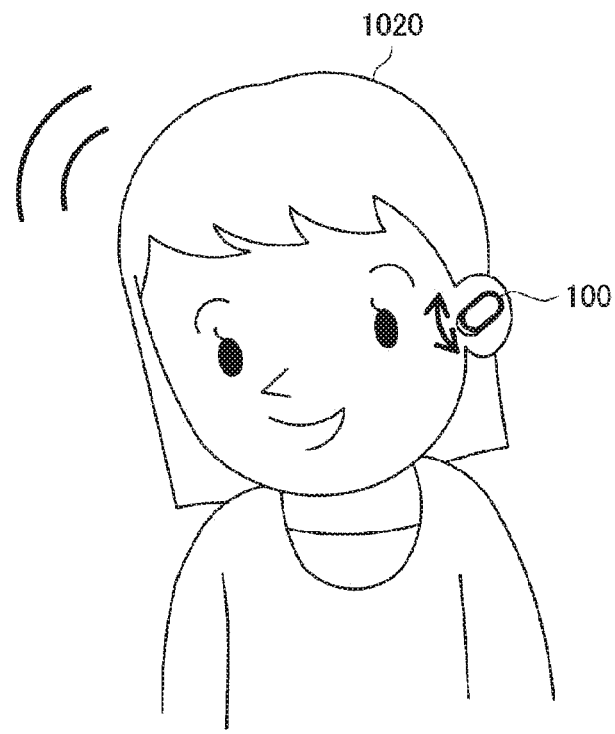
FIG. 15 is a schematic view illustrating a first example of proxy utterance processing based on a motion of a head of a user according to the second embodiment.
Figure 16:
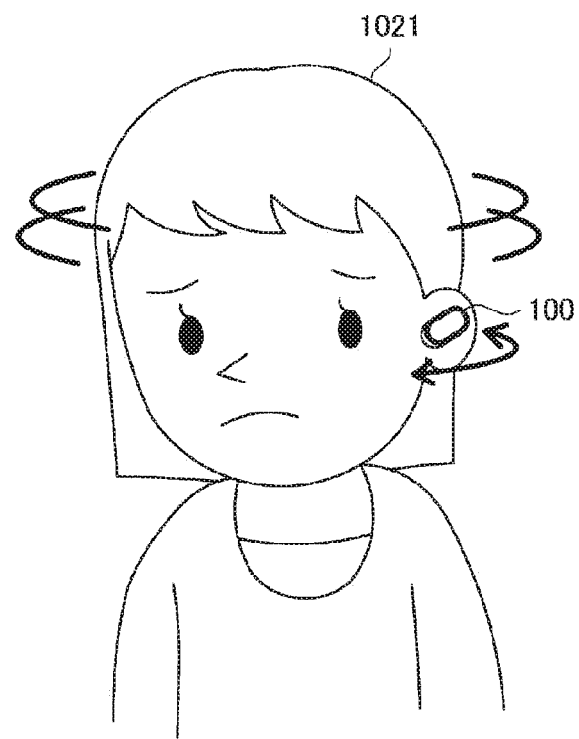
FIG. 16 is a schematic view illustrating a second example of proxy utterance processing based on a motion of a head of a user according to the second embodiment.

FIGS. 15 and 16 are schematic views illustrating an example of proxy utterance processing based on a motion of a head of a user according to the present embodiment. First, as illustrated in FIG. 15, a user 1020 is wearing the small terminal 100. In this case, a motion of a head of the user 1020 is detected by the acceleration sensor 132, the gyro sensor 133, or the like provided in the small terminal 100. Specifically, as illustrated in FIG. 15, it is assumed that the user 1020 shakes his/her head in a longitudinal direction. In this case, the communication control unit 414 performs the proxy utterance processing on the basis of detected information indicating that the user 1020 shakes his/her head in the longitudinal direction. The proxy utterance in this case includes a content corresponding to "YES" with respect to a voice message from the talk target. For example, a voice of a content "OK!" can be transferred to the talk target by the proxy utterance processing.

Meanwhile, as illustrated in FIG. 16, a user 1021 is wearing the small terminal 100. In this case, a motion of a head of the user 1021 is detected by the acceleration sensor 132, the gyro sensor 133, or the like provided in the small terminal 100. Specifically, as illustrated in FIG. 16, it is assumed that the user 1021 shakes his/her head in a transverse direction. In this case, the communication control unit 414 performs the proxy utterance processing on the basis of detected information indicating that the user 1021 shakes his/her head in the transverse direction. The proxy utterance in this case includes a content corresponding to "NO" with respect to a voice message from the talk target. For example, a voice of a content "NO!" can be transferred to the talk target by the proxy utterance processing.

According to such proxy utterance processing, the user can talk or reply to the talk target by a voice without the utterance. Therefore, even in an environment in which the user cannot utter a word, it is possible to easily transfer an intention to the talk target by only a gesture such as the shake of the head of the user.

Note that voice information in the proxy utterance may be voice information generated by a voice recorded in advance by the user or may be voice information generated by extracting a voice generated by the utterance of the user in the past voice communication.

Furthermore, such sensor information includes, for example, information regarding a worn state of the small terminal 100, obtained from the proximity sensor 131 included in the small terminal 100. In that case, the communication control unit 414 performs the proxy utterance processing depending on the worn state of the small terminal 100.

For example, when the small terminal 100 is worn on a user's ear, it is assumed that the proximity sensor 131 has detected the worn state of the small terminal 100. In that case, the communication control unit 414 performs the proxy utterance processing on the basis of detected information indicating that the small terminal 100 has been worn. Specifically, the communication control unit 414 performs the proxy utterance processing including a content indicating that the user is online from the fact that the user has worn the small terminal 100. With this configuration, the talk target can easily know that the user is online.

On the other hand, it is assumed that the proximity sensor 131 has detected a situation in which the small terminal 100 is not worn on the user's ear. In this case, when a voice message is received from the talk target, the communication control unit 414 performs the proxy utterance processing including a content indicating the situation in which the small terminal 100 is not worn (for example, "a small terminal is not worn" or the like). With this configuration, the talk target can know that the user is in a state in which he/she cannot talk.

Furthermore, such sensor information may be, for example, sensor information obtained from a device (another device) other than the small terminal 100. The sensor information may be, for example, sensor information (third sensor information) obtained from another wearable device attached to or worn by the user, such as the ring-type device, the bracelet-type device such as the smart watch, the necklace-type device, the device of the type worn on the trunk, the device embedded in the body, or the like, as described above. In this case, the communication control unit 414 may perform the proxy utterance processing on the basis of the sensor information obtained from another device.

Note that in the proxy utterance processing based on the sensor information, there may be a case in which processing based on an unintended gesture or the like is performed. Therefore, for example, in a case where a state of the voice communication is a predetermined state, the communication control unit 414 may not perform the proxy utterance processing. The predetermined state includes, for example, a state in which the user himself/herself is uttering a word and a state in which the other party is not uttering a word. In this case, for example, the communication control unit 414 does not transmit the voice information related to the proxy utterance or does not reproduce the voice information related to the proxy utterance received in the talk target.

(Proxy Utterance Processing Based on Information Regarding Context)

Furthermore, for example, the communication control unit 414 may control the proxy utterance processing on the basis of the information regarding the context. Specifically, the context analysis unit 412 first analyzes the context of the user who uses the mobile terminal 200 from the environment information or the like, and outputs the information regarding the context. Then, the communication control unit 414 performs the proxy utterance processing on the basis of the information regarding the context.

Figure 17:
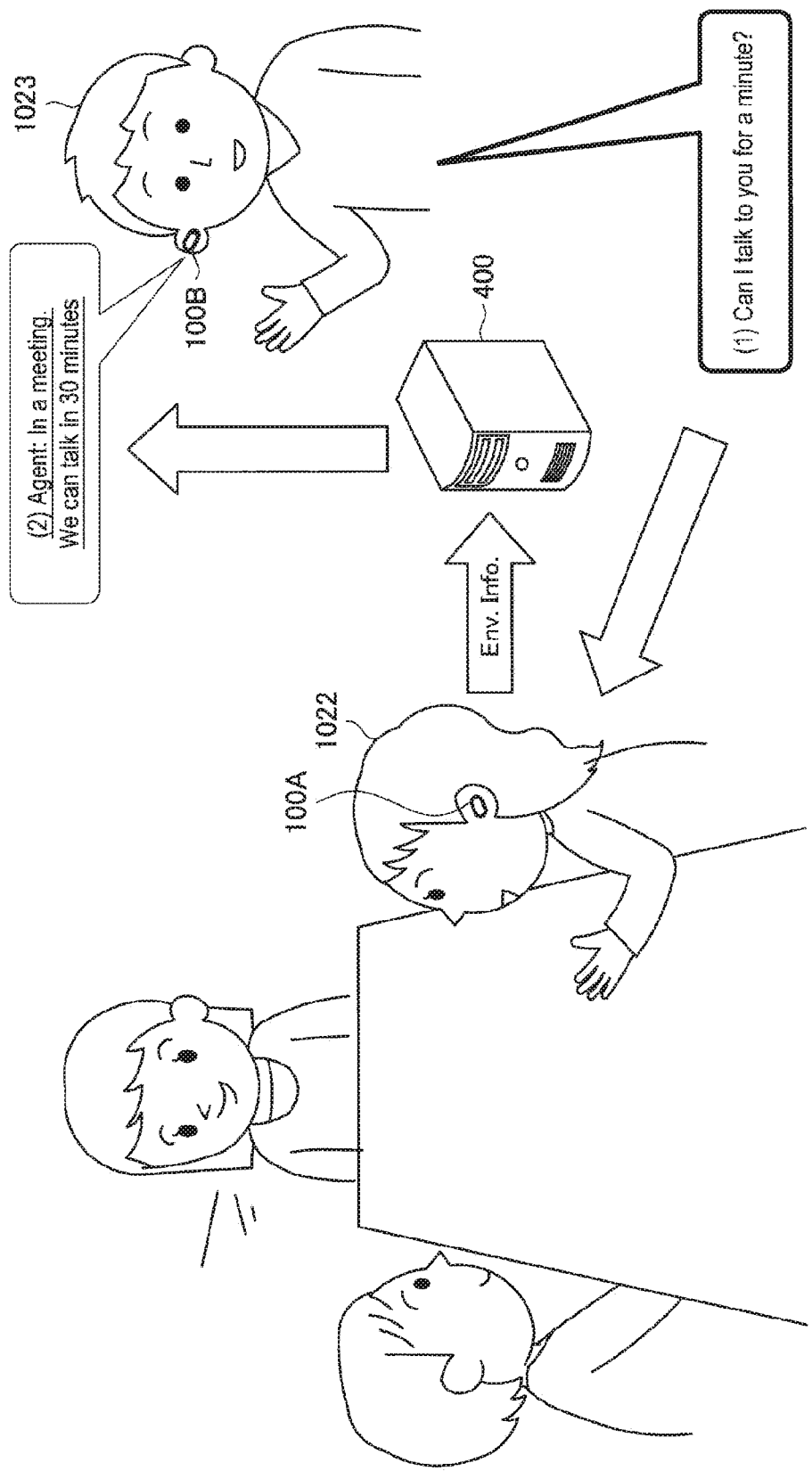
FIG. 17 is a schematic view illustrating an example of proxy utterance processing based on information regarding a context according to the second embodiment.

FIG. 17 is a schematic view illustrating an example of proxy utterance processing based on information regarding a context according to the present embodiment. As illustrated in FIG. 17, it is assumed that a user 1022 wearing a small terminal 100A is in a meeting and a voice message (1) has been received from a user 1023 wearing a small terminal 100B to the user 1022 through voice communication. In this case, environment information (for example, including position information, schedule information, and the like) is transmitted from a mobile terminal 200 (not illustrated) possessed by the user 1022 to the server 400. The server 400 analyzes a context from the environment information to acquire information regarding the context indicating that the user 1022 is in a meeting. In this case, the communication control unit 414 transfers a proxy voice message (2) to the small terminal 100B of the user 1023. For example, instead of the user 1022, a virtual agent may transfer a phrase "In a meeting. We can talk in 30 minutes" to the user 1023. With this configuration, the user 1022 can respond to the user 1023 without actively answering.

Note that the proxy utterance processing based on the information regarding the context may be performed, for example, when a predetermined condition is satisfied after the voice message is received from the talk target. The predetermined condition includes, for example, a condition in which a user's manipulation or operation on the small terminal 100 or the mobile terminal 200 has not been detected for a predetermined time.

(Proxy Utterance Processing Based on Analysis Information of Voice Input in Voice Communication)

For example, the communication control unit 414 may control the proxy utterance processing on the basis of the analysis information of the voice input in the voice communication. More specifically, the information analysis unit 411 first analyzes the voice information input to the small terminal 100 or the like. Then, the communication control unit 414 performs the proxy utterance processing on the basis of an analysis result of the voice information.

For example, characteristic voices such as a user's cough, dry cough, or gargle, may be used for the proxy utterance processing. In this case, the information analysis unit 411 analyzes these characteristic voices. Then, the communication control unit 414 performs the proxy utterance processing on the basis of an analysis result of the voice. Specifically, it is assumed that a voice message has been received from the talk target in a case where the user wearing the small terminal 100 is in a meeting. In this case, when the user has a dry cough, a voice derived from the dry cough is input to the small terminal 100 and is transmitted to the server 400. Then, the voice is analyzed by the information analysis unit 411, and the communication control unit 414 performs proxy utterance processing corresponding to the dry cough. For example, the communication control unit 414 transfers a proxy voice message of a content "In a meeting. I will contact you later" to the talk target. With this configuration, even though the user does not utter a phrase, the voice message intended by the user can be transmitted to the other party.

Note that these characteristic voices may be decided by, for example, a technology such as machine learning. Association between patterns of the characteristic voices and contents of the proxy utterance may be set by the user or may be automatically set by learning.

The example of the proxy utterance processing has been described above. Note that the voice used for the proxy utterance in the proxy utterance processing is not particularly limited. For example, the voice used for the proxy utterance may be a voice obtained by recording a predetermined message read out by the user in advance or may be a voice reproduced from a user's voice recorded in advance by a text-to-speech (TTS) technology. Furthermore, the voice used for the proxy utterance is not limited to a voice of only the user, and may be a voice of another person (for example, a voice of a celebrity) or the like. Furthermore, the voice used for the proxy utterance may be a voice corresponding to the acquired context. For example, in a case where a context indicating that the user is on the train is analyzed, the communication control unit 414 may transmit a sound of the bumpy train to the talk target as the proxy utterance. Furthermore, the communication control unit 414 may transmit a voice message "Mr. A is on the train", in addition to the sound of the bumpy train, to the talk target. In this case, the communication control unit 414 may combine the sound of the bumpy train as background music (BGM) of the voice message "Mr. A is on the train" with the voice message at a sound volume smaller than that of the voice message, and transmit the voice message with which the sound is combined to the talk target. With this configuration, the talk target side can intuitively grasp a situation of the user.

Furthermore, the voice transmitted to the talk target may be selected depending on an analysis result of the voice information in the voice communication. For example, in a case where the voice by the proxy utterance is transmitted to a user or a group superior to the user, it is likely that a formal phrase will be included in the voice information. Therefore, in a case where the information analysis unit 411 analyzes the voice information to decide that many formal phrases are included in the voice information, the communication control unit 414 may transmit a formal voice message to the talk target (for example, the communication control unit 414 transfers a sound of a content "I see" as a positive answer to the talk target. On the other hand, in a case where the voice by the proxy utterance is transmitted to a user or a group equal or junior to the user, it is likely that a casual phrase will be included in the voice information. Therefore, in a case where the information analysis unit 411 analyzes the voice information to decide that many casual phrases are included in the voice information, the communication control unit 414 may transmit a casual voice message to the talk target (for example, the communication control unit 414 transfers a sound of a content "OK!" as a positive answer to the talk target). With this configuration, in the proxy utterance processing, a talk can be more naturally conducted.

Note that the voice output processing in the voice communication with the talk target is not limited to the proxy utterance processing for the talk target in the voice communication. For example, the communication control unit 414 may perform processing related to adjustment of the voice in the voice communication on the basis of the environment information.

For example, the communication control unit 414 may perform the processing related to the adjustment of the voice in the voice communication on the basis of the information regarding the context. For example, it is assumed that the information analysis unit 411 has analyzed the voice information in the voice communication to determine that a conversation with a low degree of association with the user is being performed. In this case, the communication control unit 414 may perform processing for controlling the small terminal 100 so as to decrease a sound volume of the speaker 140 of the small terminal 100 worn by the user.

Here, a level of a degree of association with the user may be determined on the basis of, for example, the number of users participating in the voice communication, the number of user names detected in the voice communication, the number of utterance opportunities of the user, the number of utterance opportunities by a gesture or the like of the user, or a conversation content.

Furthermore, for example, it is assumed that the information analysis unit 411 has analyzed the voice information in the voice communication to determine that the user is in a noisy environment from the voice information from the small terminal 100 worn by the user. In this case, the communication control unit 414 may perform processing for controlling the small terminal 100 so as to increase a sound volume of the speaker 140 of the small terminal 100 worn by the user.

With such a configuration, it is possible to automatically adjust the voice on the basis of a situation of the user.

Furthermore, the communication control unit 414 may separately perform processing for controlling the small terminal 100 or the mobile terminal 200 so as to record a voice message from an utterance target in the proxy utterance processing. With this configuration, the user can again confirm a voice message that he/she could not respond.

The second embodiment of the present disclosure has been described hereinabove. Note that the functions of the communication control unit 414 according to the present embodiment can be combined with the first embodiment.

4. Third Embodiment

Figure 18:
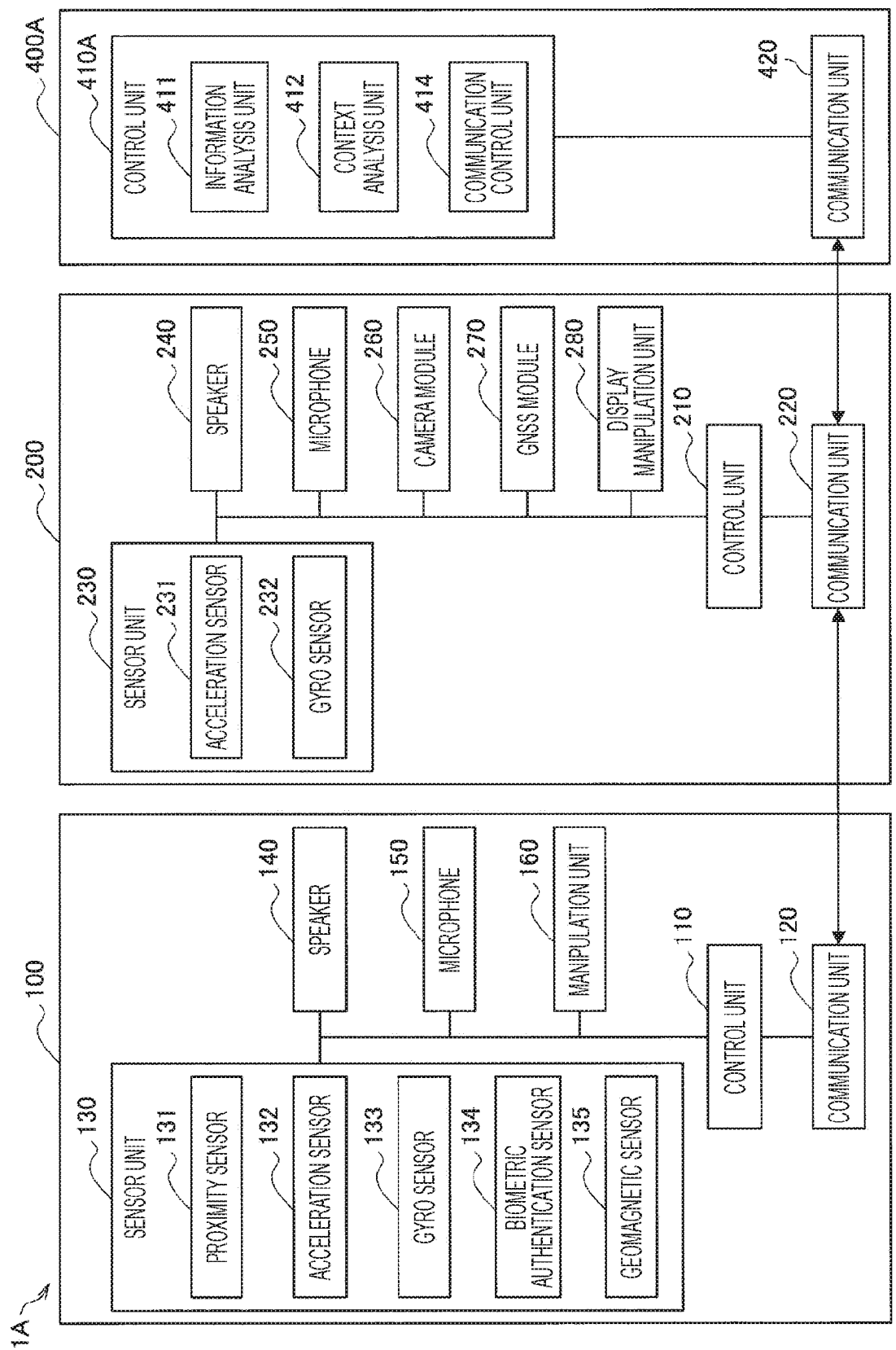
FIG. 18 is a block diagram illustrating a configuration of an information processing system according to a third embodiment of the present disclosure.

Next, a third embodiment of the present disclosure will be described. FIG. 18 is a block diagram illustrating a configuration of an information processing system 1A according to a third embodiment of the present disclosure. In a server 400A illustrated in FIG. 18, a control unit 410A does not include the grouping processing unit 413 unlike the server 400 according to the first embodiment. In other words, the server 400A does not have a function as the grouping processing unit 413.

Therefore, the server 400A according to the present embodiment realizes various functions of the communication control unit 414 of the server 400 according to the second embodiment described above. In other words, the communication control unit 414 according to the present embodiment controls processing related to voice communication on the basis of environment information regarding a user terminal. Such voice communication is communication between mobile terminals 200 in a predetermined user or group.

Also in the configuration of the server 400A according to the present embodiment, the communication control unit 414 according to the present embodiment can exert the function of the communication control unit 414 according to the second embodiment described above. In other words, even if the server 400A does not have the function related to the grouping processing, the server 400A can control various types of processing related to the voice communication.

The third embodiment of the present disclosure has been described hereinabove.

5. Fourth Embodiment

Next, a fourth embodiment of the present disclosure will be described. In the present embodiment, an assistant function by the communication control unit 414 will be described. The assistant function is a function related to explanation of a situation of voice communication and a response to a user in a talk in voice communication among a plurality of users or in a group. With such an assistant function, it is possible to more accurately grasp the situation of the talk and make a conversation content richer.

The assistant function presents information to each user by a voice in the voice communication. Specifically, the information analysis unit 411 first analyzes information regarding the voice communication. The information regarding the voice communication includes a participation situation of the user in the voice communication or voice information in the voice communication. Then, the communication control unit 414 appropriately presents the information to the user or the like by a voice on the basis of an analysis result of the information regarding the voice communication.

Furthermore, for example, the communication control unit 414 may perform processing for presenting the information by the voice to all the users who are participating in the voice communication group. Furthermore, the communication control unit 414 may perform processing for presenting the information by the voice only to users who satisfy a predetermined condition among the users participating in the voice communication group.

Figure 19:
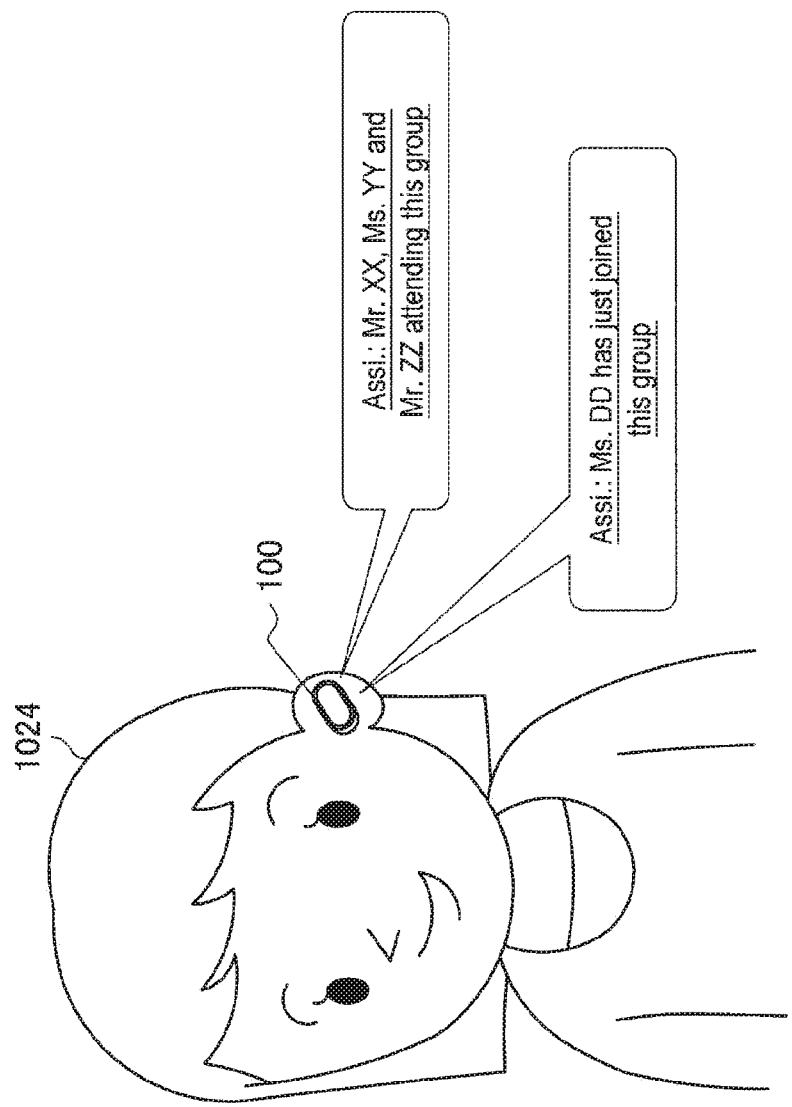
FIG. 19 is a schematic view for describing an example of the assistant function according to a fourth embodiment of the present disclosure.

An example of the assistant function will be described. FIG. 19 is a schematic view for describing an example of the assistant function according to the present embodiment. As illustrated in FIG. 19, it is assumed that a user 1024 wearing the small terminal 100 participates in a talk in a predetermined group. First, it is assumed that the user 1024 has participated in the talk in the predetermined group. In this case, the information analysis unit 411 determines that the user 1024 has joined the group of the voice communication. Then, the communication control unit 414 presents information regarding users participating in the group to the user 1024 by a voice. In the example illustrated in FIG. 19, a voice "Mr. XX, Mr. YY, and Mr. ZZ are attending this group" is transmitted to the user 1024 through the small terminal 100.

Furthermore, it is assumed that another user has participated in the predetermined group during the talk of the user 1024. In this case, the information analysis unit 411 determines that another user has joined the group of the voice communication. Then, the communication control unit 414 presents the fact that a new user has participated in the group to the user 1024 by a voice. In the example illustrated in FIG. 19, a voice "Mr. DD has just joined this group" is transmitted to the user 1024 through the small terminal 100.

As described above, by presenting information based on the participation situation of the user of the voice communication to the user by the voice, it is possible to easily grasp the participation situation of the user of the group while conducting the talk. Note that, for example, a participation situation of the users who have originally participated in the group may be presented only to the user who has newly participated in the group. Furthermore, information regarding the user who has newly participated in may be presented to each of the users who have originally participated in the group.

Figure 20:
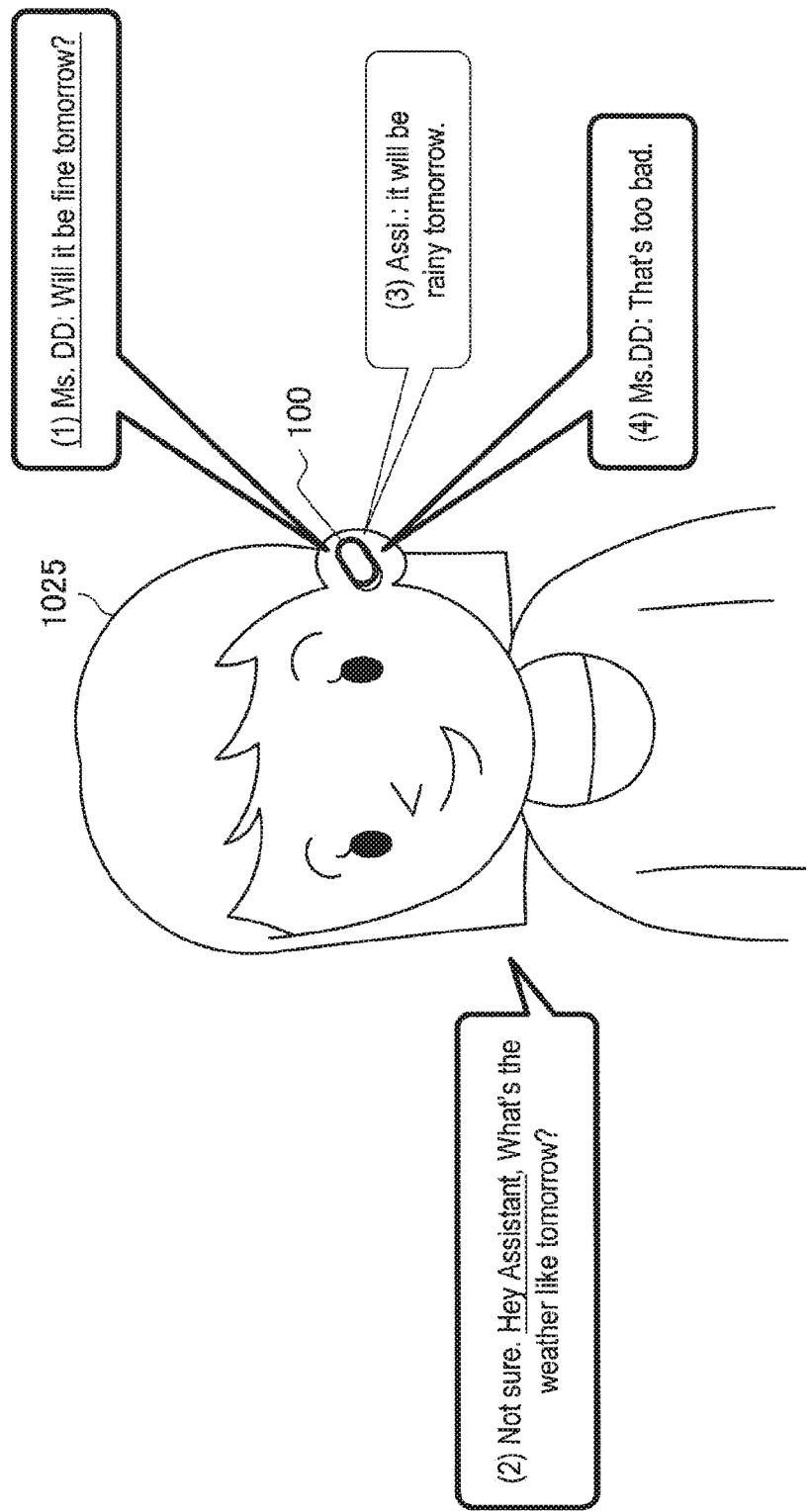
FIG. 20 is a schematic view for describing another example of an assistant function according to the fourth embodiment.

Furthermore, another example of the assistant function will be described. FIG. 20 is a schematic view for describing another example of the assistant function according to the present embodiment. As illustrated in FIG. 20, it is assumed that a user 1025 wearing the small terminal 100 is talking in voice communication with another user (Ms. DD). First, it is assumed that another user has sent a voice message (1) related to tomorrow's weather and the user 1025 has answered that he/she does not grasp the tomorrow's weather (voice message (2)). In this case, for example, it is assumed that the user 1025 utters "Hey Assistant". A phrase of such utterance serves as a trigger for invoking the assistant function. Such a phrase for invoking the assistant function can be extracted, for example, by analysis of the voice information by the information analysis unit 411.

Subsequently, if the user 1025 asks a question about the tomorrow's weather, a voice "it will be rainy tomorrow" is transferred to the user 1025 and another user by the assistant function (Assi.) (for example, another user (Ms. DD) comments for information presented by the assistant function in a voice message (4)).

As described above, by presenting information (for example, a response to a question) based on the voice information related to the assistant function in the voice communication to each user by a voice, it is possible to make a conversation content in the talk richer. Note that in the example illustrated in FIG. 20, the assistant function presents the information to each user by the voice, but the voice information may be presented only to a specific user. For example, in a case where only the user himself/herself wants to know specific information or in transferring the information only to the specific user, the assistant function of the communication control unit 414 may be exerted.

Furthermore, the communication control unit 414 may present a content of the past talk in the voice communication or the like to the user by a voice as the assistant function. For example, the communication control unit 414 may present a talk content before the user has joined the group of the voice communication or a summary of the talk content to the user who has newly joined the group of the voice communication by the voice. With this configuration, the user who has newly joined the group can immediately catch up with a topic of the talk. Note that the summary of the talk content can be generated by, for example, the information analysis unit 411.

Furthermore, the summary of the talk content may be displayed on, for example, a display unit or the like instead of the voice. For example, in a case where the small terminal 100 is a watch type and has a display unit, the summary of the talk content may be displayed in characters on the display unit of the small terminal 100. Furthermore, in a case where the small terminal 100 does not have the display unit, a summary of the talk content may be displayed in characters on the display manipulation unit 280 of the mobile terminal 200.

Furthermore, in a case where the user joins a predetermined group as the assistant function, the communication control unit 414 may provide whether or not to move the talk target to another group in a case where a voice message is received from another group, by a voice. For example, in a case where a conversation in a group of voice communication related to "work" is started with respect to a user participating in a group of voice communication related to "hobby", the communication control unit 414 may present "Do you want to move to a "work" group?" by a voice. Furthermore, the communication control unit 414 may perform control to switch the group of the talk target on the basis of a response of the user to such presentation. With this configuration, the user can easily switch to a talk to another group even while talking in one group.

Note that the movement of the group of the voice communication may be performed on the basis of importance of the group. For example, in a case where the "work" group is more important than the "hobby" group, the communication control unit 414 may present to the user that a conversation is being started in the "work" group and move the talk target of the user from the "hobby" group to the "work" group. With this configuration, it is possible to avoid a defect that the user cannot participate in a more important talk.

The fourth embodiment of the present disclosure has been described hereinabove. Note that the functions of the communication control unit 414 according to the present embodiment can be combined with the first embodiment, the second embodiment, and the third embodiment.

6. Fifth Embodiment

Next, a fifth embodiment of the present disclosure will be described. In the present embodiment, a delay suppression function by the communication control unit 414 will be described. The delay suppression function means a function of suppressing a delay occurring between a start point in time of utterance at an utterance source and a point in time until voice communication between the utterance source and an utterance destination is constructed. The delay caused by the construction of the voice communication can be reduced by such a delay suppression function to keep a delay of utterance in a talk a delay based on the transmission rate. In this case, even if a user utters a word from a point in time when the voice communication is started, a voice is almost immediately transferred to a talk target. With this configuration, the user can have an experience as if he/she has a conversation in a face-to-face manner, and can more easily talk in the voice communication. Note that the delay suppression function according to the present embodiment is realized by the server 400, but in another embodiment, the delay suppression function may be realized by the small terminal 100 or the mobile terminal 200.

Figure 21:
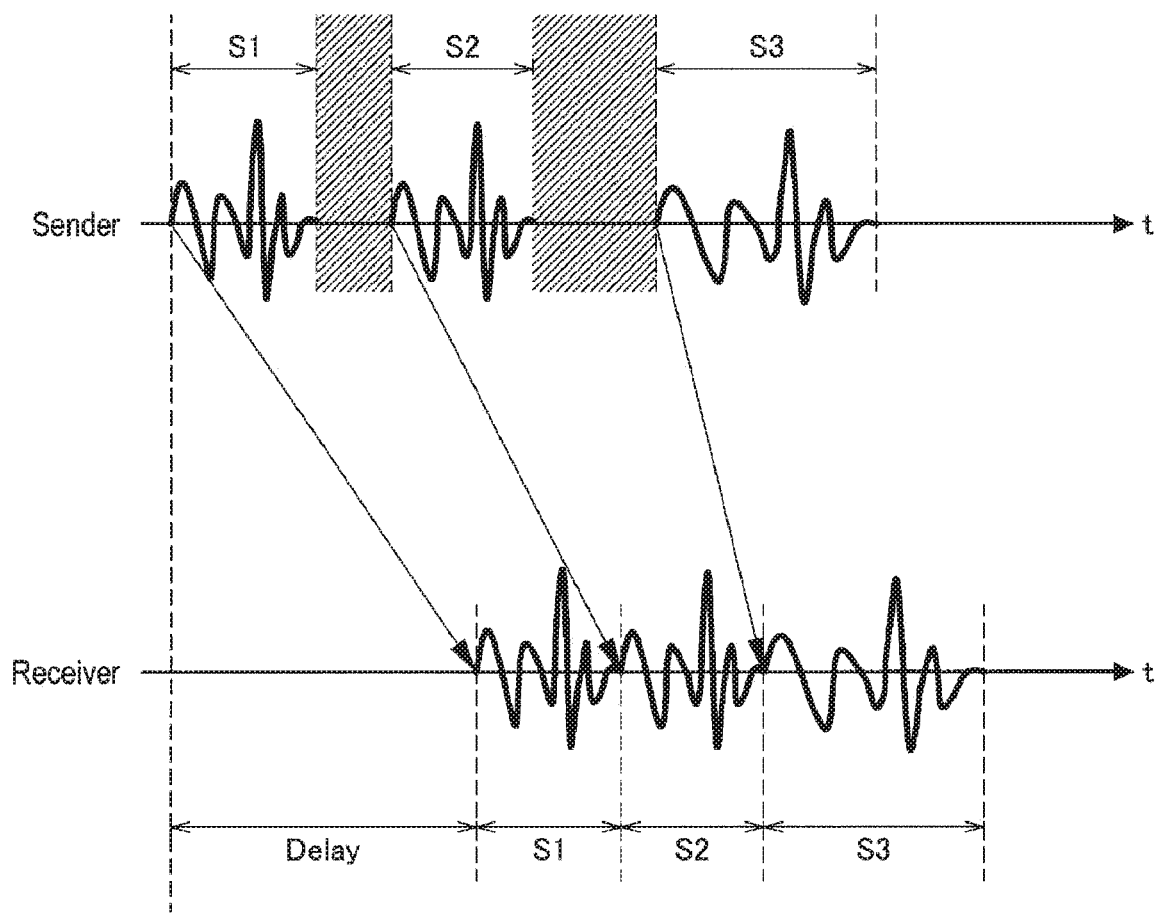
FIG. 21 is a schematic view for describing a delay suppression function according to a fifth embodiment of the present disclosure.

Hereinafter, the delay suppression function according to the present embodiment will be described. FIG. 21 is a schematic view for describing the delay suppression function according to the present embodiment. Referring to FIG.

21, a voice is first uttered from a user who is an utterance source (sender). In this case, when voice information regarding the voice of the user is transmitted to the server 400, the information analysis unit 411 extracts voice sections S1, S2, and S3 by known voice section detection means.

Note that in such voice communication, a delay (Delay) due to construction of voice communication occurs between an utterance source and an utterance destination (Receiver). Therefore, the voice information first reaches the utterance destination at a point in time when Delay has elapsed.

Therefore, the communication control unit 414 transmits only the extracted voice sections S1, S2, and S3 to a mobile terminal 200 of a user of the utterance destination (Receiver). In this case, as illustrated in FIG. 21, the voice information is processed so that the voice sections S1, S2, and S3 are continuous in time series.

With this configuration, non-voice sections occurring between the voice sections are omitted, and a delay can thus be reduced by the omitted non-voice sections. By repeatedly performing such delay suppression processing, it is possible to reduce the delay due to the construction of the voice communication.

The fifth embodiment of the present disclosure has been described hereinabove. Note that the functions of the communication control unit 414 according to the present embodiment can be combined with the first embodiment, the second embodiment, the third embodiment, and the fourth embodiment.

7. Hardware Configuration

The embodiments of the present disclosure have been described hereinabove. The various processes described above are realized by cooperation between software and hardware described below.

Figure 22:
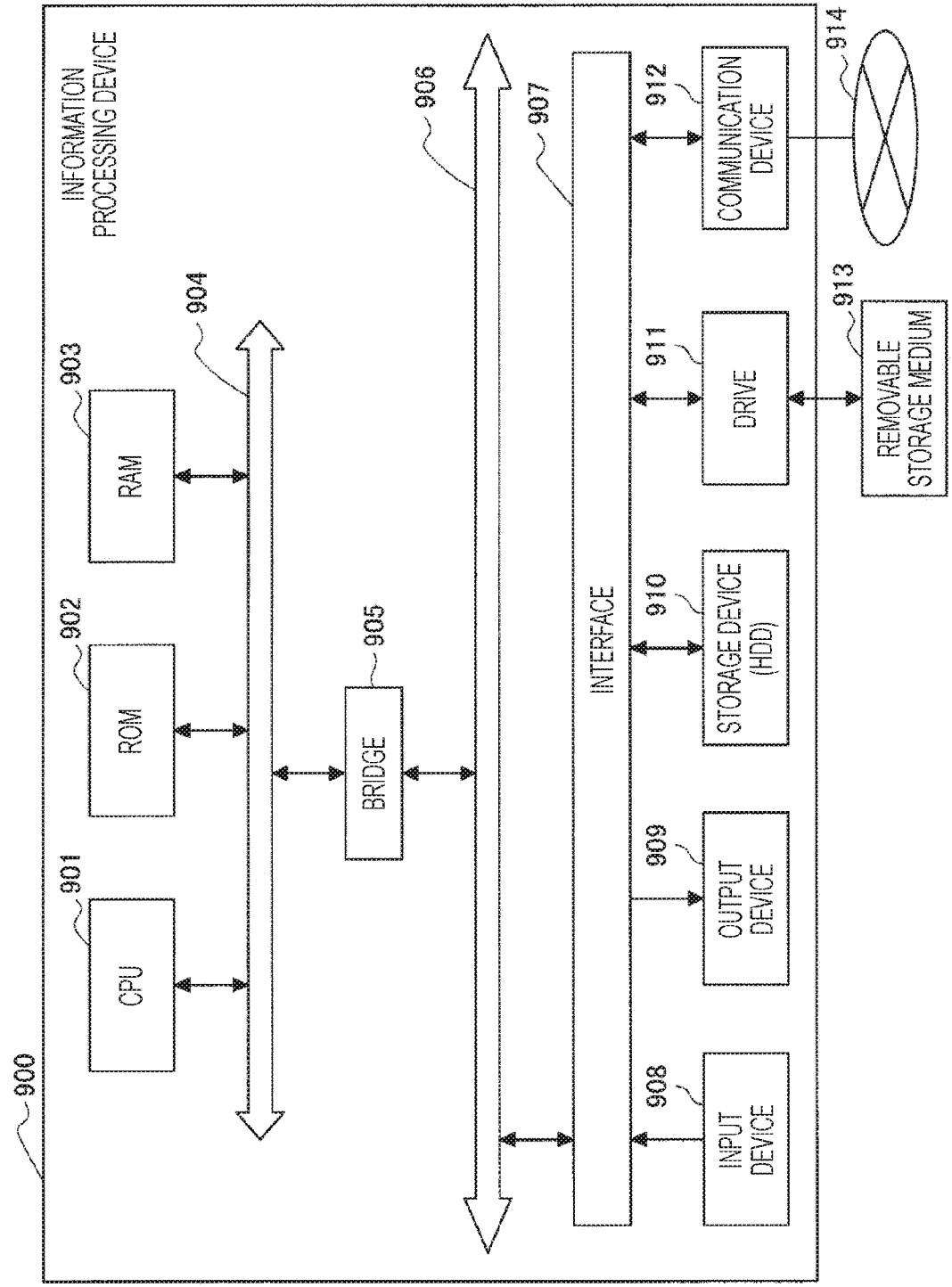
FIG. 22 is a view illustrating a hardware configuration of an information processing apparatus according to the present disclosure.

FIG. 22 is a view illustrating a hardware configuration of an information processing apparatus 900 implementing the small terminal 100, the mobile terminal 200, or the server 400 according to the present disclosure. The information processing apparatus 900 includes a CPU 901, a ROM 902, a RAM 903, and a host bus 904. Furthermore, the information processing apparatus 900 further includes a bridge 905, an external bus 906, an interface 907, an input device 908, an output device 909, a storage device (HDD) 910, a drive 911, and a communication device 912.

The CPU 901 functions as an arithmetic processing unit and a control unit, and generally controls an operation in the information processing apparatus 900 according to various programs. Furthermore, the CPU 901 may be a microprocessor. The ROM 902 stores programs, calculation parameters, or the like used by the CPU 901. The RAM 903 temporarily stores programs used in execution of the CPU 901, parameters appropriately changed in the execution, or the like. The CPU 901, the ROM 902, and the RAM 903 are connected to each other by the host bus 904 including a CPU bus and the like. The function of the control unit 110 of the small terminal 100 can be realized by cooperation among the CPU 901, the ROM 902, and the RAM 903 (the same goes for the mobile terminal 200 and the server 400).

The host bus 904 is connected to the external bus 906 such as a peripheral component interconnect/interface (PCI) bus through the bridge 905. Note that the host bus 904, the bridge 905, and the external bus 906 need not to be separately configured, and functions of the host bus 904, the bridge 905, and the external bus 905 may be implemented on a single bus.

The input device 908 includes input means through which a user inputs information, such as a touch panel, a button, a microphone, and a switch, and an input control circuit generating an input signal on the basis of an input by the user and outputting the generated input signal to the CPU 901. The user of the information processing apparatus 900 can input various data to the information processing apparatus 900 and instruct the information processing apparatus 900 to perform a processing operation by operating the input device 908.

The output device 909 includes, for example, a display device such as a cathode ray tube (CRT) display device, a liquid crystal display (LCD) device, and an organic light emitting diode (OLED) device, a lamp. Moreover, the output device 909 includes an audio output device such as a speaker and a headphone. The output device 909 outputs, for example, a reproduced content. Specifically, the display device displays various information such as reproduced video data as a text or an image. On the other hand, the audio output device converts reproduced audio data or the like into an audio and outputs the audio.

The storage device 910 is a device for storing data. The storage device 910 may include a storage medium, a recording device recording data in the storage medium, a reading device reading data from the storage medium, a deleting device deleting data recorded in the storage medium, and the like. The storage device 910 includes, for example, an HDD, an SDD or the like. The storage device 910 drives a hard disk and stores programs executed by the CPU 901 and various data. The function of the storage unit (not shown) of the mobile terminal 200 can be realized by the storage device 910 (the same goes for the server 400).

The drive 911 is a reader/writer for the storage medium, and is externally mounted on the information processing apparatus 900. The drive 911 reads information recorded in a removable storage medium 913 such as a mounted magnetic disk, optical disk, magneto-optical disk, or semiconductor memory and outputs the read information to the RAM 903. Furthermore, the drive 911 can also write information to the removable storage medium 913.

The communication device 912 is, for example, a communication interface including a communication device or the like for being connected to a communication network 914. An example of such a communication interface includes a near field communication interface such as Bluetooth (registered trademark) or ZigBee (registered trademark) or a communication interface such as wired/wireless LAN, Wi-Fi (registered trademark), or a mobile communication network (LTE or 3G). The function of the communication unit 120 of the small terminal 100 can be realized by the communication device 912 (the same goes for the mobile terminal 200 and the server 400).

8. Summary

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Note that the respective steps in the processing of the information processing apparatus (for example, the server

400) of the present specification do not necessarily have to be processed in time series in orders described as the flowcharts. For example, the respective steps in the processing of the information processing apparatus may be processed in orders different from the orders described as the flowcharts or may be processed in parallel.

Furthermore, it is also possible to create a computer program for causing hardware such as the CPU, the ROM, and the RAM embedded in the information processing apparatus to exert a function equivalent to that of each configuration of the information processing apparatus described above. Furthermore, a readable recording medium in which the computer program is stored is also provided.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

An information processing apparatus including: a grouping processing unit that groups a user terminal on the basis of environment information regarding the user terminal acquired from the user terminal.

(2)

The information processing apparatus according to the above (1), in which the environment information includes first sensor information detected and obtained by the user terminal, and the grouping processing unit groups the user terminal on the basis of an analysis result obtained by analyzing the first sensor information.

(3)

The information processing apparatus according to the above (2), in which the first sensor information includes at least any one of information regarding a sound, information regarding a motion of the user terminal, or position information of the user terminal.

(4)

The information processing apparatus according to any one of the above (1) to (3), in which the environment information includes image information generated by capturing an image of a subject by the user terminal, and the grouping processing unit groups the user terminal on the basis of an analysis result obtained by analyzing the image information.

(5)

The information processing apparatus according to any one of the above (1) to (4), in which the grouping processing unit groups the user terminal on the basis of information regarding a context of a user who uses the user terminal, the information regarding the context of the user being obtained from the environment information.

(6)

The information processing apparatus according to any one of the above (1) to (5), in which the environment information includes second sensor information detected and obtained by a device different from the user terminal.

(7)

The information processing apparatus according to any one of the above (1) to (6), in which the grouping processing unit groups the user terminal on the basis of a history of the environment information.

(8)

The information processing apparatus according to any one of the above (1) to (7), in which the grouping processing unit generates identification information of a group on the basis of the environment information, the group being generated by grouping processing.

(9)

The information processing apparatus according to any one of the above (1) to (8), in which the grouping processing unit performs grouping on a group related to voice communication through the user terminal, the information processing apparatus further including a communication control unit that controls processing related to the voice communication.

(10)

The information processing apparatus according to the above (9), in which the communication control unit controls the processing related to the voice communication on the basis of the environment information regarding the user terminal.

(11)

The information processing apparatus according to the above (10), in which the communication control unit controls the processing related to the voice communication on the basis of information regarding a context of a user who uses the user terminal, the information regarding the context of the user being obtained from the environment information.

(12)

The information processing apparatus according to the above (10) or (11), in which the communication control unit controls the processing related to the voice communication on the basis of third sensor information obtained by detecting a device attached to or worn by the user.

(13)

The information processing apparatus according to the above (12), in which the device attached to or worn by the user includes a voice input/output device used for the voice communication.

(14)

The information processing apparatus according to any one of the above (10) to (13), in which the communication control unit controls the processing related to the voice communication on the basis of analysis information of a voice input in the voice communication.

(15)

The information processing apparatus according to any one of the above (10) to (14), in which the processing related to the voice communication includes processing related to start of the voice communication.

(16)

The information processing apparatus according to any one of the above (10) to (15), in which the processing related to the voice communication includes processing related to selection of a communication target of the voice communication.

(17)

The information processing apparatus according to any one of the above (10) to (16), in which the processing related to the voice communication includes processing related to a voice output in the voice communication with a talk target.

(18)

The information processing apparatus according to the above (17), in which the processing related to the voice output in the voice communication with the talk target includes proxy utterance processing for the talk target in the voice communication.

(19)
An information processing method performed by a processor, including:
acquiring environment information regarding a user terminal from the user terminal; and
grouping the user terminal on the basis of the acquired environment information.
(20)
An information processing system including:
a user terminal that is able to acquire environment information regarding the user terminal; and
a server that includes a grouping processing unit grouping the user terminal on the basis of the environment information regarding the user terminal acquired from the user terminal.

REFERENCE SIGNS LIST

1 Information processing system
100 Small terminal
110 Control unit
120 Communication unit
130 Sensor unit
131 Proximity sensor
132 Acceleration sensor
133 Gyro sensor
134 Biometric authentication sensor
135 Geomagnetic sensor
140 Speaker
150 Microphone
160 Manipulation unit
200 Mobile terminal
210 Control unit
220 Communication unit
230 Sensor unit
231 Acceleration sensor
232 Gyro sensor
240 Speaker
250 Microphone
260 Camera module
270 GNSS module
280 Display manipulation unit
300 Communication network
400 Server
410 Control unit
411 Information analysis unit
412 Context analysis unit
413 Grouping processing unit
414 Communication control unit
420 Communication unit

The invention claimed is:

1. An information processing apparatus comprising:
circuitry configured to
acquire environment information from a plurality of user terminals, the environment information being acquired by a sensor included in each of the plurality of user terminals;
perform grouping processing of two or more user terminals of the plurality of user terminals as a talk target group of user terminals, by analyzing context of each user corresponding to the talk target group of user terminals, based on the environment information, the context of at least one user being analyzed as working in an office, according to position information and time information of the user based on the environment information of the user terminal corresponding to the at least one user; and
control proxy utterance processing in voice talk processing on a basis of the environment information regarding the talk target group of user terminals.

2. The information processing apparatus according to claim 1, wherein the circuitry controls the proxy utterance processing on a basis of a content of a gesture acquired from the talk target group of user terminals, the content of the gesture being obtained from the environment information.

3. The information processing apparatus according to claim 1, wherein the circuitry controls the proxy utterance processing on a basis of a worn state of the talk target group of user terminals, the worn state of the talk target group of user terminals being obtained from the environment information.

4. The information processing apparatus according to claim 1, wherein the environment information includes first sensor information detected and obtained by the talk target group of user terminals, the first sensor information including state information of the user terminal included in the talk target group of user terminals, and
the circuitry controls the proxy utterance processing on a basis of an analysis result obtained by analyzing the first sensor information.

5. The information processing apparatus according to claim 4, wherein the first sensor information includes at least any one of information regarding a sound detected by at least one of the user terminal included in the talk target group of user terminals, information regarding a motion of at least one of the user terminal included in the talk target group of user terminals, or position information of at least one of the user terminal included in the talk target group of user terminals.

6. The information processing apparatus according to claim 1, wherein the circuitry controls the proxy utterance processing on a basis of analysis information of a voice input in voice communication.

7. The information processing apparatus according to claim 1, wherein the circuitry performs control to determine whether or not to transmit voice information to the talk target group of user terminals, on a basis of the environment information.

8. The information processing apparatus according to claim 7, wherein the voice information transmitted to the talk target group of user terminals is information according to the context of each user corresponding to the talk target group of user terminals.

9. The information processing apparatus according to claim 1, wherein the circuitry performs analyzing context of at least one user as attending a meeting in an office, according to application information of the user based on the environment information of the user terminal corresponding to the at least one user.

10. The information processing apparatus according to claim 1, wherein the circuitry performs analyzing context of at least one user as manipulating a specific application, according to application information of the user based on the environment information of the user terminal corresponding to the at least one user.

11. The information processing apparatus according to claim 1, wherein the circuitry performs analyzing context of at least one user as talking to another group of users, according to application information of the user based on the environment information of the user terminal corresponding to the at least one user.

12. The information processing apparatus according to claim 1, wherein the circuitry is further configured to send notification information to each of the user terminal included in the talk target group of user terminals, the notification information being presented for permission to join the talk target group of user terminals in advance to performing grouping processing.

13. The information processing apparatus according to claim 1, wherein the circuitry is further configured to perform grouping processing of two or more user terminals of the plurality of user terminals as the talk target group of user terminals, the two or more user terminals being located in a predetermined space.

14. The information processing apparatus according to claim 5, wherein the circuitry is further configured to perform grouping processing of two or more user terminals of the plurality of user terminals as the talk target group of user terminals, based on history of the position information of the two or more user terminals, the two or more user terminals continuously being in an approach state in a predetermined space.

15. The information processing apparatus according to claim 5, wherein the circuitry is further configured to select a talk target user based on a direction of a user face, according to the environment information.

16. An information processing method performed by a processor, comprising:
    acquiring environment information from a plurality of user terminals, the environment information being acquired by a sensor included in each of the plurality of user terminals;
    performing grouping processing of two or more user terminals of the plurality of user terminals as a talk target group of user terminals, by analyzing context of each user corresponding to the talk target group of user terminals, based on the environment information, the context of at least one user being analyzed as working in an office, according to position information and time information of the user based on the environment information of the user terminal corresponding to the at least one user; and
    controlling proxy utterance processing in voice talk processing on a basis of the acquired environment information regarding the talk target group of user terminals.

17. An information processing system comprising:
a plurality of user terminals, each of the plurality of user terminals configured to acquire environment information regarding the corresponding user terminal by a sensor; and
a server configured to
    acquire the environment information from the plurality of user terminals;
    perform grouping processing of two or more user terminals of the plurality of user terminals as a talk target group of user terminals, by analyzing context of each user corresponding to the talk target group of user terminals, based on the environment information, the context of at least one user being analyzed as working in an office, according to position information and time information of the user based on the environment information of the user terminal corresponding to the at least one user; and
    control proxy utterance processing in voice talk processing on a basis of the environment information regarding the talk target group of user terminals.

* * * * *